United States Patent
Ribaudo et al.

(10) Patent No.: US 8,688,141 B2
(45) Date of Patent: *Apr. 1, 2014

(54) SYSTEM AND METHOD FOR PROVIDING COMMUNICATION SERVICES TO MOBILE DEVICE USERS INCORPORATING PROXIMITY DETERMINATION

(75) Inventors: Charles S. Ribaudo, Menlo Park, CA (US); James F. Young, Jr., Dallas, TX (US)

(73) Assignee: Jambo Networks, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,207

(22) Filed: Mar. 30, 2012

(65) Prior Publication Data

US 2012/0329475 A1    Dec. 27, 2012

Related U.S. Application Data

(63) Continuation of application No. 11/463,284, filed on Aug. 8, 2006, now Pat. No. 8,150,416.

(60) Provisional application No. 60/706,595, filed on Aug. 8, 2005.

(51) Int. Cl.
*H04W 24/00* (2009.01)

(52) U.S. Cl.
USPC ............... 455/456.1; 455/456.2; 455/456.5; 455/456.6; 455/404.2; 455/403

(58) Field of Classification Search
USPC .......... 455/456.1, 456.3, 414.1, 404.2, 456.5, 455/456.6; 370/328–338
See application file for complete search history.

(56) References Cited

U.S. PATENT DOCUMENTS

| | | |
|---|---|---|
| 4,173,016 A | 10/1979 | Dickson |
| 4,348,744 A | 9/1982 | White |
| 5,086,394 A | 2/1992 | Shapira |
| 5,555,376 A | 9/1996 | Theimer et al. |
| 5,963,951 A | 10/1999 | Collins |
| 6,020,810 A | 2/2000 | Har-Even |
| 6,047,053 A | 4/2000 | Miner et al. |
| 6,052,122 A | 4/2000 | Sutcliffe et al. |
| 6,061,681 A | 5/2000 | Collins |
| 6,073,105 A | 6/2000 | Sutcliffe et al. |
| 6,150,937 A | 11/2000 | Rackman |
| 6,202,023 B1 | 3/2001 | Hancock et al. |
| 6,256,664 B1 | 7/2001 | Donoho et al. |
| 6,424,819 B1 | 7/2002 | Yan |
| 6,493,550 B1 | 12/2002 | Raith |

(Continued)

OTHER PUBLICATIONS

PCT Second and Supplementary Notice Informing the Applicant of the Communication of International Application (to designated offices which apply the 30 month time limit under Article 22(1)) re PCT/US 2004/027815 (10 pgs, Dec. 29, 2005.

(Continued)

*Primary Examiner* — Kathy Wang-Hurst
(74) *Attorney, Agent, or Firm* — Baker Botts L.L.P.

(57) ABSTRACT

In certain embodiments, a method for proximity determination includes receiving one or more network identifiers, each associated with a corresponding network, from a first mobile device. The method further includes receiving one or more network identifiers, each associated with a corresponding network, from a second mobile device. The method further includes processing the network identifiers received from the first and second mobile devices to determine whether the first mobile device and the second mobile device are in proximity to one another.

26 Claims, 4 Drawing Sheets

(56) References Cited

U.S. PATENT DOCUMENTS

| | | |
|---|---|---|
| 6,539,232 B2 | 3/2003 | Hendrey et al. |
| 6,542,749 B2 | 4/2003 | Tanaka et al. |
| 6,542,750 B2 | 4/2003 | Hendrey et al. |
| 6,549,768 B1 | 4/2003 | Fraccaroli |
| 6,618,593 B1 | 9/2003 | Drutman |
| 6,647,270 B1 | 11/2003 | Himmelstein |
| 6,664,891 B2 | 12/2003 | Davies et al. |
| 6,671,737 B1 | 12/2003 | Snowdon et al. |
| 6,681,108 B1 | 1/2004 | Terry et al. |
| 6,690,918 B2 | 2/2004 | Evans et al. |
| 6,714,791 B2 | 3/2004 | Friedman |
| 6,735,568 B1 | 5/2004 | Buckwalter et al. |
| 6,760,770 B1 | 7/2004 | Kageyama |
| 6,819,919 B1 | 11/2004 | Tanka |
| 7,593,740 B2 | 9/2009 | Crowley et al. |
| 7,809,805 B2 | 10/2010 | Stremel et al. |
| 2001/0055950 A1 | 12/2001 | Davies et al. |
| 2002/0081972 A1 | 6/2002 | Rankin |
| 2002/0165919 A1 | 11/2002 | Pietila |
| 2002/0194049 A1 | 12/2002 | Boyd |
| 2003/0037103 A1 | 2/2003 | Salmi et al. |
| 2003/0065806 A1 | 4/2003 | Thomason et al. |
| 2003/0087652 A1 | 5/2003 | Simon et al. |
| 2003/0157963 A1 | 8/2003 | Collot |
| 2003/0191673 A1 | 10/2003 | Cohen |
| 2004/0002348 A1 | 1/2004 | Fraccaroli |
| 2004/0014457 A1 | 1/2004 | Stevens |
| 2004/0014486 A1 | 1/2004 | Carlton et al. |
| 2004/0120298 A1 | 6/2004 | Evans et al. |
| 2004/0131188 A1 | 7/2004 | Wang et al. |
| 2004/0198397 A1 | 10/2004 | Weiss |
| 2004/0248569 A1 | 12/2004 | Kondou et al. |
| 2005/0021666 A1 | 1/2005 | Dinnage et al. |
| 2005/0048961 A1 | 3/2005 | Ribaudo et al. |
| 2005/0054290 A1 | 3/2005 | Logan et al. |
| 2005/0054352 A1 | 3/2005 | Karaizman |
| 2005/0130634 A1 | 6/2005 | Godfrey |
| 2005/0157689 A1 | 7/2005 | Schnurr |
| 2005/0191963 A1 | 9/2005 | Hymes |
| 2006/0003775 A1 | 1/2006 | Bull et al. |
| 2006/0046743 A1 | 3/2006 | Mirho |
| 2007/0015516 A1 | 1/2007 | Huotari et al. |
| 2007/0030824 A1 | 2/2007 | Ribaudo et al. |

OTHER PUBLICATIONS

"More than bringing people together," *Spotme Conference Navigator*, © 2003 by Shockfish; www.spotme.com (2 pgs.), last visited May 22, 2006.

Ratto, et al., The Activeclass Project: Experiments in Encouraging Classroom Participation, © 2003 *Kluwer Academic Publishers* (10 pgs.), last visited May 22, 2006.

trepia.com, downloaded from http://www.trepia.com/ on May 22, 2006 (2 pgs.).

Lovegety, downloaded from http://search.msn.com/results.aspx?srch=105&FORM=AS5&q=Lovegety on May 22, 2006 (2 pgs.)

"SONbuddy® Self-Organizing Private Community Networking,", downloaded from http://www.greenpacket.com/2005/en/products/index.asp on May 22, 2006 (3 pgs.).

"Uniter," www.findtheone.com.

"Cybiko," downloaded from http://en.wikipedia.org/wiki/Cybiko on May 22, 2006 (2 pgs.).

"nTAG Interactive" selected web pages downloaded from http://ntag.com on May 22, 2006 (1 pg.).

http://ntags.com, selected web pages downloaded on Feb. 5, 2008 (1 pg.).

Paul Krill, *IBM Experiments with Socializer Technology*, LinusWorld.com.au, Aug. 9, 2003; (3 pgs).

USPTO, Office Action Summary for U.S. Appl. No. 10/928,857, filed Aug. 27, 2004, in the name of Charles S. Ribaudo et al., (29 pgs.), Notification Date Nov. 25, 2008.

USPTO Summary for U.S. Appl. No. 10/928,857, filed Aug. 27, 2004, in the name of Charles S. Ribaudo et al., (33 pgs.), Notification Date Apr. 2, 2008.

USPTO, Office Action Summary for U.S. Appl. No. 10/928,857, filed Aug. 27, 2004, in the name of Charles S. Ribaudo et al., (33 pgs.), Notification Date Jul. 13, 2007.

USPTO, Final Office Action Summary for U.S. Appl. No. 10/928,857, filed Aug. 27, 2004, in the name of Charles S. Ribaudo et al., (35 pgs.), Notification Date Aug. 28, 2008.

Charles S. Ribaudo et al., U.S. Appl. No. 11/463,284, filed Aug. 8, 2006, "Response Pursuant to 37 C.F.R. § 1.111", (30 pgs.), date filed Oct. 7, 2011.

Charles S. Ribaudo et al., U.S. Appl. No. 11/463,284, filed Aug. 8, 2006, "Response Accompanying Request for Continued Examination", (29 pgs.), date filed Aug. 1, 2010.

Charles S. Ribaudo et al., U.S. Appl. No. 11/463,284, filed Aug. 8, 2006, "Response Pursuant to 37 C.F.R. § 1.111", (24 pgs.), date filed Nov. 14, 2009.

US 6,731,928, 05/2004, Tanaka (withdrawn)

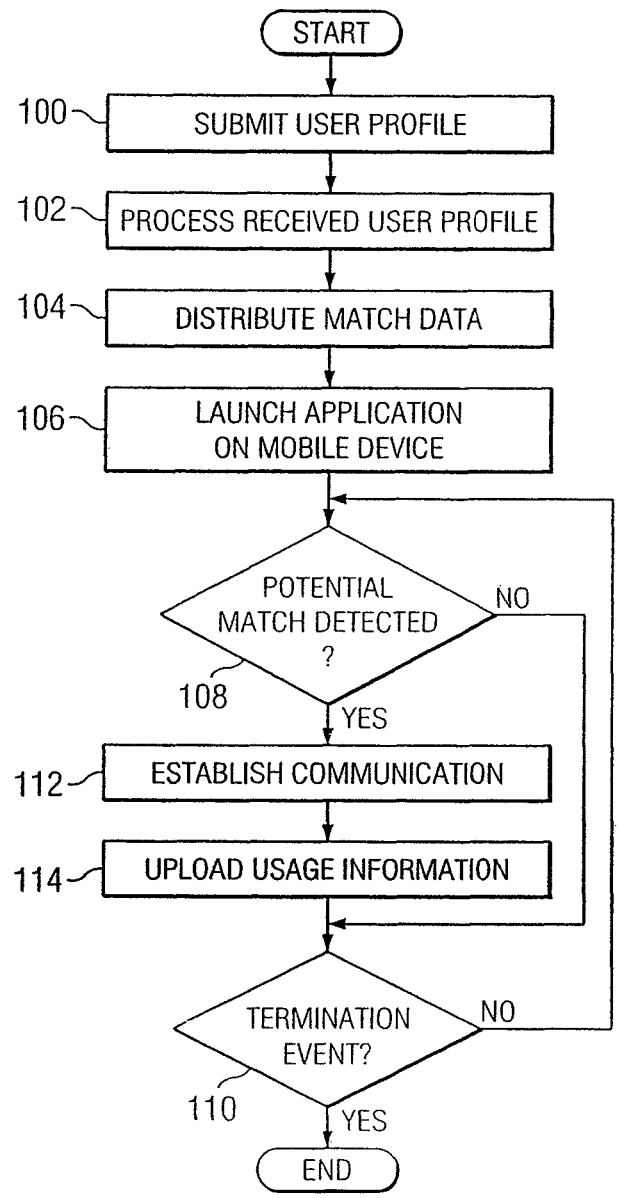

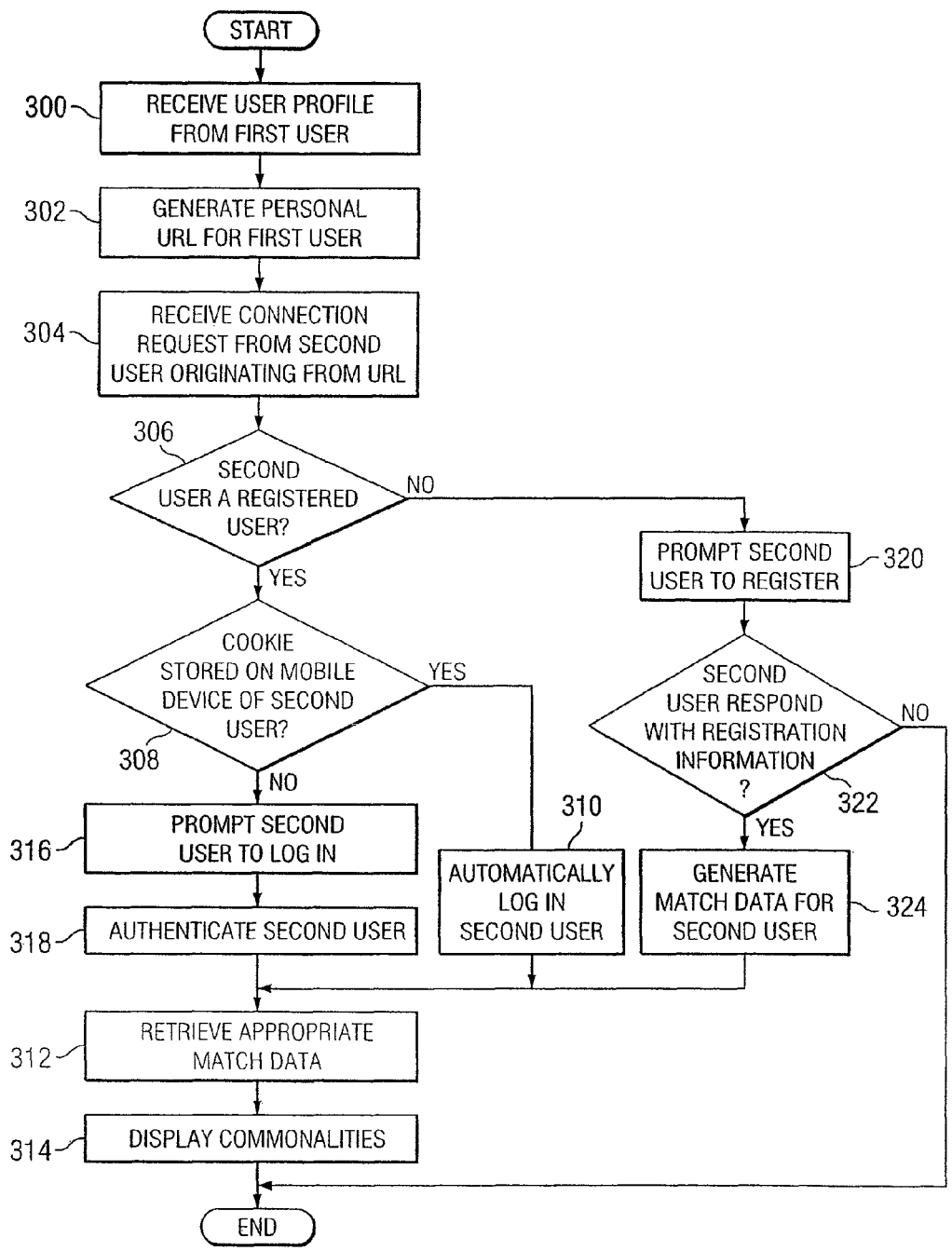

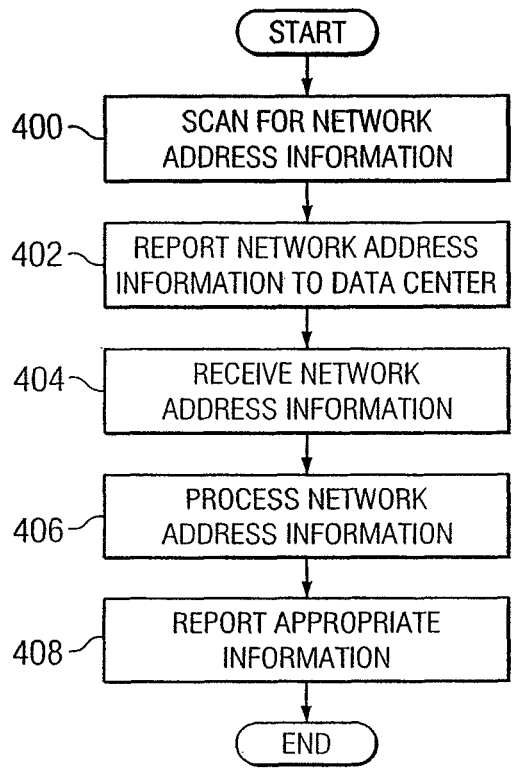
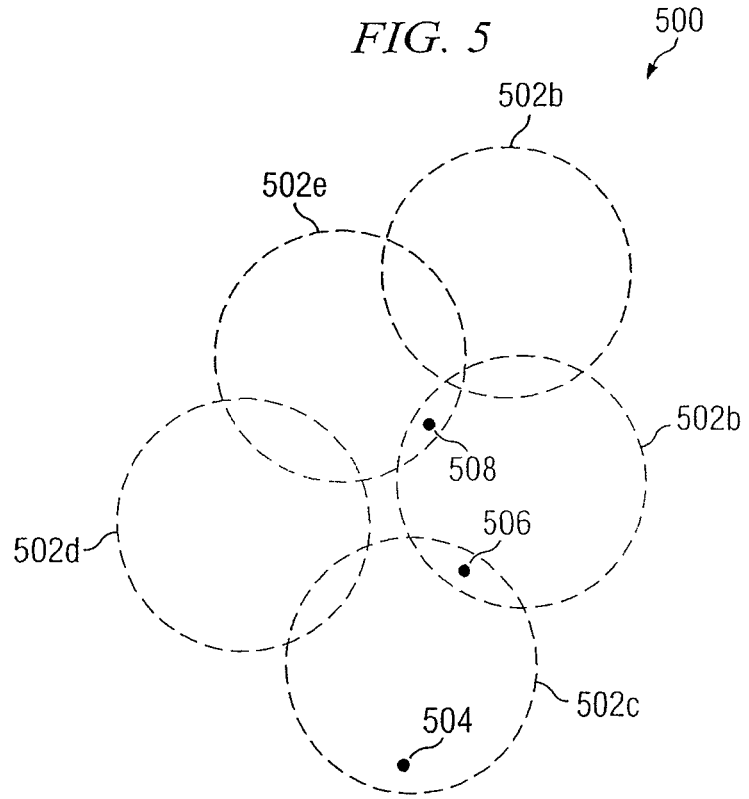

SYSTEM AND METHOD FOR PROVIDING COMMUNICATION SERVICES TO MOBILE DEVICE USERS INCORPORATING PROXIMITY DETERMINATION

CROSS REFERENCE TO RELATED APPLICATIONS

This application is a continuation of U.S. application Ser. No. 11/463,284 filed Aug. 8, 2006, entitled "System and Method for Providing Communication Services to Mobile Device Users Incorporating Proximity Determination," to be U.S. Pat. No. 8,150,416, which claims the benefit under 35 U.S.C. §119(e) of U.S. Provisional Application No. 60/706,595, entitled "System and Method for Providing Communication Services to Mobile Device Users Incorporating Proximity Determination," filed on Aug. 8, 2005.

TECHNICAL FIELD OF THE INVENTION

This invention relates generally to mobile communications and more particularly to a system and method for providing communication services to mobile device users incorporating proximity determination.

BACKGROUND

Personal network building has become increasingly important. A person may desire to network for a variety of reasons. For example, a person may desire to network for business purposes, social purposes, or for any other suitable reasons. A person may be in proximity of hundred or even thousands of other people every day. However, networking with any of these people is often difficult without any prior knowledge of them. It is challenging to identify desirable people with whom to network from a random or semi-random selection of the general population. Even at a large conference with thousands of attendees who necessarily have at least some common interests, it is often difficult for a person to determine the most relevant of these people with whom to meet. Traditionally, people join organizations and attend events to meet other people, but such activities are often extremely time consuming. Although people who have certain common interests, such as belonging to the same organization, attending the same university, or enjoying the same music, may be near each other at a public location, they are frequently unaware of these common interests and the opportunity to meet each other.

In recent years, people began exploring the Internet for network building, utilizing formats such as chat rooms and news groups for example. Typically, a chat room enables its users to enter and receive messages in real time, while a news group enables its users to post and reply to messages. However, users of chat rooms and news groups are frequently located in different locations, perhaps thousands of miles from each other. As a result, elaborate planning may be needed for people sharing common interests to locate and meet each other. For example, online sites may still require users to complete the elaborate process of visiting the online sites to network with other users and then scheduling a time and place for a meeting, if desired.

SUMMARY OF THE INVENTION

According to the present invention, disadvantages and problems associated with previous techniques for providing communication services to mobile device users may be reduced or eliminated.

In certain embodiments, the present invention allows mobile device users with one or more commonalities or other reasons for interacting to detect each other when they are or have been in physical proximity. In certain embodiments, the present invention may compare any number of user-supplied profiles at a data center or other centralized location remote from the mobile device users, determine which users are matches for one another in that they appear to have one or more commonalities or other reasons for interacting, and transmit to each user match data containing match identifiers and other information for the other users determined to be matches for the user. This pre-processed match data for the user is stored locally on the user's mobile device. Subsequently, when the user is in proximity to another user, the user's mobile device detects the presence of the other user's mobile device, receives an identifier associated with the detected other user, and compares the received identifier with the pre-processed match data stored on the user's mobile device to determine whether the other user is one of the user's predetermined matches. In certain embodiments, this detection of another user in proximity and determination of whether another detected user is a match is performed locally on the user's mobile device, without consulting the data center or other centralized location remote from the mobile device users. If the other user is determined to be one of the user's predetermined matches, then the user may arrange to meet or otherwise interact with the match to build a new relationship or enhance an existing one. The user may connect with the match through any of a number of possible mechanisms. The user may do so substantially immediately, if the match is still in proximity to the user and the user wishes to interact at that time, or the user may do so at a later time.

In certain embodiments, a first user's mobile device detects the presence of a second user's mobile device in proximity based on network identifiers communicated from the mobile devices of the first and second users. In a particular embodiment, a method for proximity determination includes receiving one or more network identifiers, each associated with a corresponding network, from a first mobile device. The method further includes receiving one or more network identifiers, each associated with a corresponding network, from a second mobile device. The method further includes processing the network identifiers received from the first and second mobile devices to determine whether the first mobile device and the second mobile device are in proximity to one another.

Facilitating networking according to certain embodiments of the present invention may provide a number of technical advantages over prior techniques, one or more of which may be readily apparent to those skilled in the art from the figures, descriptions, and claims included herein. Those skilled in the art should appreciate that particular embodiments of the present invention may provide all, some, or none of these advantages.

BRIEF DESCRIPTION OF THE DRAWINGS

For a more complete understanding of the present invention and its advantages, reference is made to the following descriptions, taken in conjunction with the accompanying drawings, in which:

FIG. 2 illustrates an example method for providing communication services to users of mobile devices;

FIG. 3 illustrates an example method for assigning and processing a personal uniform resource locator (URL) according to certain embodiments of the present invention;

FIG. 4 illustrates an example method for proximity determination according to certain embodiments of the present invention; and FIG. 5 illustrates an example set of networks that may be used for centralized proximity detection according to certain embodiments of the present invention.

DESCRIPTION OF EXAMPLE EMBODIMENTS

Figure 1:
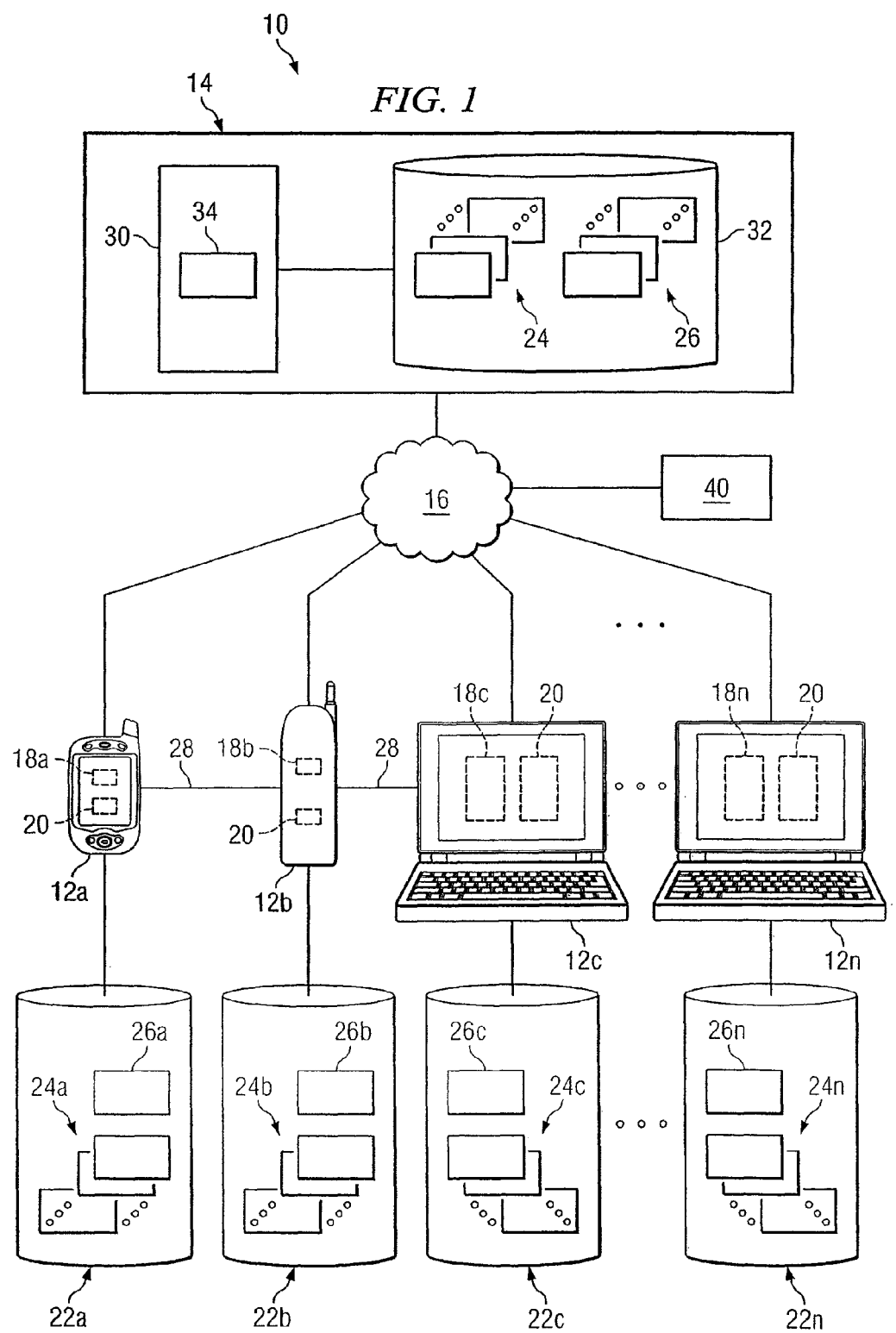
FIG. 1 illustrates an example system for providing communication services to users of mobile devices.

FIG. 1 illustrates an example system 10 for providing communication services to users of mobile devices. System 10 includes one or more mobile devices 12, a data center 14, and a network 16 that may couple mobile devices 12 and data center 14 at appropriate times. Although an example implementation of system 10 is illustrated and primarily described, the present invention contemplates any suitable implementation of system 10.

In general, certain embodiments of system 10 allow users of mobile devices 12 with one or more commonalities or other reasons for interacting to detect each other when they are or have been in physical proximity. In certain embodiments, the present invention may compare any number of user-supplied profiles at data center 14 or another centralized location remote from the users of mobile devices 12, determine which users are matches for one another in that they appear to have one or more commonalities or other reasons for interacting, and transmit to each user match data containing match identifiers and other information for the other users determined to be matches for the user. This pre-processed match data for the user is stored locally on the user's mobile device 12. Subsequently, when the user is in proximity to another user, the user's mobile device 12 detects the presence of the other user's mobile device 12, receives an identifier associated with the detected other user, and compares the received identifier with the pre-processed match data stored on the user's mobile device 12 to determine whether the other user is one of the user's predetermined matches. In certain embodiments, this detection of another user in proximity and determination of whether another detected user is a match is performed locally on the user's mobile device 12, without consulting data center 14 or another centralized location remote from the users of mobile devices 12. If the other user is determined to be one of the user's predetermined matches, then the user may arrange to meet or otherwise interact with the match to build a new relationship or enhance an existing one. The user may connect with the match through any of a number of possible mechanisms. The user may do so substantially immediately, if the match is still in proximity to the user and the user wishes to interact at that time, or the user may do so at a later time.

In certain embodiments of the present invention, data center 14 is operable to gather and store information regarding users of mobile devices 12, networks detected by users of mobile devices 12 (e.g., including information regarding the wireless infrastructure, information regarding which users encounter which components of the wireless infrastructure, and other suitable information), encounters between users of mobile devices 12, and other suitable information. For example, data center 14 may gather and store information identifying various network access points encountered by users of mobile devices 12 and may assign data to those network access points. This information may be used to match users of mobile devices 12 with other users of other mobile devices 12, to match users of mobile devices 12 with locations associated with particular networks, or for other suitable purposes. These concepts are described in more detail throughout this description.

Mobile devices 12 may include any suitable types of devices capable of communicating with other devices. Typically, mobile devices 12 are portable at least to some degree. Mobile devices 12 may include, for example, "laptop" computers, "palmtop" computers, personal digital assistants, pagers, cellular telephones, game consoles, cameras, or any other suitable types of portable devices. Each mobile device 12 may include one or more suitable devices for wireless communication, such as one or more wireless fidelity (Wi-Fi) devices, one or more BLUETOOTH devices, one or more Global System for Mobile Communication (GSM) devices, one or more code division multiple access (CDMA) devices, one or more Worldwide Interoperability for Microwave Access (WiMax) devices, and/or any other suitable communication devices. Although a particular number of mobile devices 12 are illustrated, system 10 may include any suitable number of mobile devices 12. For example, the number of mobile devices 12 may vary over time depending on the number of users of system 10 and their mobile device needs. Throughout this description, mobile devices 12 and users of mobile devices 12 may be referred to interchangeably where appropriate.

Mobile devices 12 may each include any suitable combination of hardware, software, and firmware to provide the functionality described herein and any other appropriate functionality. In certain embodiments, mobile devices 12 each include one or more web browsers. Each mobile device 12 may include an adaptor 18. Each adaptor 18 may include or otherwise be associated with one or more applications 20 that are based on one or more programming languages, such as C, C++, C#, Java, or any other suitable language. The adaptor 18 of a mobile device 12 (e.g., mobile device 12a) may facilitate communication with other mobile devices 12 (e.g., mobile devices 12b through 12n) and between mobile device 12 and data center 14.

In certain embodiments, adaptor 18 includes a protocol driver that is operable to facilitate identifying mobile device 12 to a wireless network. For example, the protocol driver of mobile device 12 may broadcast a service set identifier (SSID). In certain embodiments, the SSID is a sequence of characters that is the identifier, or name, of a wireless local area network (WLAN) (e.g., a high fidelity WLAN, typically referred to as a wireless fidelity or Wi-Fi network) or other wireless network. The SSID is a unique identifier that wireless access points and wireless nodes use to communicate with each other. The SSID may be included in the header of packets exchanged within a defined WLAN basic service set (BSS). The SSID may be set by a network administrator and, for open wireless networks, the SSID may be broadcast to one or more, if not all, wireless nodes (e.g., one or more other mobile devices 12) within range of a network access point.

In certain embodiments, one or more mobile devices 12 each include a network interface card (NIC) that is compliant with IEEE 802.11 and the network driver interface specification (NDIS), although mobile devices 12 may include any suitable type of NIC, according to particular needs. The adaptor 18 of a mobile device 12 that includes an NDIS-compliant and IEEE 802.11-compliant NIC may use the 802.11 frame or media access control (MAC) layer for detecting other mobile devices 12 in proximity. In certain embodiments, even in the absence of an NDIS-compliant NIC, the adaptor 18 may still function on the same logical network (e.g., the same Internet protocol (IP) subnet), but may not be able to take advantage of certain interface functionality. Additionally or alternatively, the protocol driver of adaptor 18 may be designed so as not to require NDIS compliance. In certain embodiments, the protocol driver may facilitate multi-hop messaging without requiring proprietary WLAN cards or transmission control protocol/internet protocol (TCP/IP) drivers. Using the protocol driver to pass messages between mobile devices 12 that are out of range of one another, other mobile devices 12 may act as wireless routers to form mesh networks, such that a mobile device 12 is not restricted by the approximately 300-foot range of a single-hop Wi-Fi network. This 300-foot range may be extended or reduced, as appropriate.

Application 20 may be operable to implement one or more features of the present invention on its associated mobile device 12. For example, application 20 may perform certain functions to facilitate communication with data center 14, completion of user profiles, authentication of users, and other suitable functions described below. In certain embodiments, application 20 may be installed on mobile device 12 using a standard Win32 installer wizard (e.g., InstallerWise, Install Shield, or any other suitable installer wizard). During this installation process, an NDIS test may be executed to test for the presence of a WLAN card that complies with NDIS 5.1 or other suitable NDIS version. For example, this test may be performed by executing a WLAN object identifier (OID) call and expecting a standard response. In certain embodiments, if the WLAN card is compliant with NDIS 5.1 or another suitable NDIS, then the WLAN card may have full on-board WINDOWS-generic WLAN support, and the install wizard may install an appropriate NDIS-compliant protocol driver. In certain embodiments, the install wizard may install the NDIS protocol driver into c:\windows\system32\drivers\ or another suitable path and may use the MICROSOFT TCP stack in addition to this protocol driver. In certain embodiments, even if no suitable protocol driver is detected, application 20 may still function on a standard TCP/IP subnet, but may not be able to take full advantage of the WLAN interface to detect other mobile devices 12 in proximity.

Additionally, certain mobile devices 12 may include a WINDOWS operating system and may include third-party card managers in addition to the MICROSOFT WINDOWS Wireless Zero Config (WZC) Service. It may be desirable to terminate these managers, so that application 20 may have control of the WLAN interface. In certain embodiments, application 20 assumes control, possibly automatically, of the WLAN interface by stopping such managers. Application 20 may also include its own network management tool, which may allow users to browse and associate with available WLANs. Additionally or alternatively, application 20 may be operable to integrate with existing managers such that those managers can work with application 20 and any other suitable components of system 10.

In certain embodiments, mobile devices 12 may each be coupled to data center 14 via network 16. Network 16 may include any suitable types of networks, including for example one or more LANs, radio access networks (RANs), metropolitan area networks (MANs), wide area networks (WANs), all or a portion of a global computer network such as the Internet, an intranet, or any other wireline, optical, wireless, or other links. Network 16 may communicate, for example, IP packets, Frame Relay frames, or Asynchronous Transfer Mode (ATM) cells to communicate voice, video, data, and other suitable information between network addresses.

Mobile devices 12 may connect to network 16, when appropriate, through a wired or wireless link. Mobile devices 12 may be identified on network 16 by a network address or combination of network addresses, such as a MAC address associated with the NIC, an IP address, a cell tower ID, and/or any other suitable network addresses according to particular needs. Mobile devices 12 may or may not be connected to network 16 at any given time.

In general, a mobile device 12 may be operable to submit a user profile for its associated user to data center 14 for comparison with user profiles for users of other mobile devices 12. In response to such comparison, mobile device 12 may receive and store match data generated at data center 14. Mobile device 12 may thereafter communicate with other mobile devices 12 detected in proximity to determine whether their associated users are matches (e.g., have been predetermined to be matches as reflected in the match data stored in mobile device 12). Mobile device 12 may notify its user if such a match is detected in proximity, allowing the user to initiate an interaction with the detected match if desired.

In certain embodiments, users of mobile devices 12 may provide user information to data center 14, via network 16 for example, so that data center 14 may predetermine matches for the users. For example, users of mobile devices 12 may each submit one or more user profiles to data center 14. In certain embodiments, users may interact with mobile devices 12 to complete their user profiles and to submit their user profiles to data center 14. A user may complete a user profile using one or more web pages, by downloading and completing a form, or in any other suitable manner according to particular needs. For example, mobile devices 12 may include an application that, either alone or in combination with a web browser, may provide users with the ability to enter information into a user profile. Text entry fields, radio buttons, drop-down menus, and/or any other suitable data input mechanism may be used to facilitate completion of user profiles. User profile information may include background information, affiliations, contacts, preferences, or any other suitable information according to particular needs. User profiles may be submitted spontaneously by a user, in response to an encounter with one or more other users, in response to an encounter with one or more locations, in response to an encounter with one or more network identifiers (e.g., MAC addresses, cell tower IDs, or other suitable identifiers), or in any other suitable manner according to particular needs.

Although users submitting user profiles using mobile devices 12 is primarily described, users may submit user profiles in any suitable manner, according to particular needs. For example, a user could submit a user profile using a conventional desktop computer. As another example, a user could complete a printed copy of a user profile form and mail it to the proprietor of system 10 for entry into data center 14. In another example, a third party could create and enter user profile information for a user.

Users of mobile devices 12 may submit multiple user profiles to data center 14. Each user profile may be based on a variety of criteria, including for example interests, affiliations, associations, events, business networking, social networking, dating, employment, exchanging goods and services, connecting friends and acquaintances, genealogy trees, and any other suitable categories. In certain embodiments, multiple user profiles for a user may have similar content but allow the user to match with different segments of users. For example, a first user profile may be a "University" user profile based on hometown and interests, and a second user profile may be a "Business Conference" user profile that includes similar content and matches on similar criteria but with a different segment of users.

Throughout this description, users who have completed one or more user profiles and submitted those user profiles to data center 14 may be referred to as "registered users." Each user of a mobile device 12 may have a unique user ID. The user ID may be used for authentication or any other suitable purposes. For example, prior to a user having access to or being able to modify the user's profile, the user may be required to provide his user ID, as well as a password or other suitable information, to data center 14.

Subsequent to a user submitting user profile information to data center 14, which may include a new user profile or updates to an existing user profile, the user may receive match data from data center 14 identifying one or more predetermined matches. Match data is described in greater detail below with respect to data center 14, but generally provides a way for a mobile device 12 to determine whether a user of another mobile device 12 is a match when the other mobile device 12 is detected in proximity. In certain embodiments, mobile device 12 may request match data from data center 14. For example, a user of mobile device 12 may log onto the user's account at data center 14 and request "synchronization," which may include downloading the most current match data for the user to mobile device 12. As another example, mobile device 12 may be configured to automatically request synchronization at regular intervals. Match data may be synchronized to mobile devices 12 in any suitable manner, according to particular needs.

Mobile devices 12 may each have an associated memory module 22. Each memory module 22 may include any suitable memory, database, or other data storage arrangement including, without limitation, magnetic media, optical media, random access memory (RAM), read-only memory (ROM), removable media, or any other suitable component. In certain embodiments, each memory module 22 is operable to store data as one or more compressed binary files. In certain embodiments, each memory module 22 may include one or more structured query language (SQL) servers. Although each mobile device 12 is illustrated as having a corresponding memory module 22, the present invention contemplates one or more mobile devices 12 sharing a memory module 22. Moreover, although a single memory module 22 is illustrated for each mobile device 12, mobile devices 12 may each include any suitable number of memory modules 22 according to particular needs.

Memory module 22 may store various data associated with the user of mobile device 12. For example, memory module 22 may store one or more user profiles 24 for the user of mobile device 12. Additionally, memory module 22 may store match data 26 downloaded from data center 14 and identifying one or more predetermined matches for the user. Memory module 22 may store any other suitable information, according to particular needs.

Data center 14 may serve as a central processing and storage node for system 10. In certain embodiments, data center 14 includes a server system 30 and a database 32. Although database 32 is illustrated as being external to server system 30, in embodiments in which data center 14 includes server system 30, the present invention contemplates database 32 being either external or internal to server system 30.

Data center 14 may include one or more computer systems at one or more locations that may share data storage, communications, or other resources according to particular needs. For example, functionality described in connection with data center 14 may be provided using a single or multiple computer systems, which in a particular embodiment might include a server or pool of servers. Furthermore, functionality described in connection with data center 14 may be provided using any suitable software components.

Each computer system associated with data center 14 may include one or more suitable input devices, output devices, mass storage media, processors, memory, interfaces, communication ports, or other appropriate components for receiving, processing, storing, and communicating information according to the operation of system 10. The one or more processors of each computer system may be a microprocessor, microcontroller, or any other suitable computing device or resource.

Database 32 may include any suitable memory, database, or other data storage arrangement including, without limitation, magnetic media, optical media, random access memory (RAM), read-only memory (ROM), removable media, or any other suitable component. In certain embodiments, database 32 includes one or more SQL servers. Moreover, although a single database 32 is illustrated, data center 14 may include any suitable number of databases 32 according to particular needs.

Data center 14 may include one or more applications 34 based on one or more programming languages, such as C, C++, SQL, Java, and/or any other suitable language. Applications 34 may assist data center 14 in performing one or more of the functions described herein.

Data center 14 is operable to receive information from mobile devices 12, as well as any other suitable devices, and store the received information in database 32. For example, data center 14 is operable to receive user profiles 24 from users of mobile devices 12 and store user profiles 24 in database 32. User profiles 24 may be stored in the format in which they were received or may be processed and stored in any other suitable format.

In certain embodiments, data center 14 is operable to process user profiles 24 to predetermine matches among users of mobile devices 12 and to generate match data 26. These matches may be based on comparisons of user profiles 24 received from users of mobile devices 12. It should be noted that a match does not necessarily indicate that two users share something in common (e.g., that two users attended the same university or enjoy the same music), but may indicate any reason why two users may wish to meet or otherwise interact. For example, users may be determined to be a match based on a particular difference between the users. In certain embodiments, data center 14 is operable to generate match data 26 for each user that indicates matches for the user. The user may then download the user's match data 26, during a synchronization for example.

In certain embodiment, data center 14 may predetermine matches among users by evaluating user profiles 24 stored in database 32. For example, when data center 14 receives a new user profile 24 or updates to an existing user profile 24, data center 14 may compare the user profile 24 to one or more other suitable, and possibly all, user profiles 24 stored in database 32 to determine whether there are any matches. Data center 14 may generate, for each user associated with the determined matches, new match data 26 that may be downloaded to the associated mobile device 12.

For each user, data center 14 may assign a score to each match based on its relevance to the user. For example, matches with a large number of commonalities (or particularly important commonality) may receive high relevance scores. Generally, when a match is determined based on comparison of user profiles 24, a new record in a match ID database table stored at database 32 is created for the match, resulting in a new file that may be synchronized to mobile device 12 when match data 26 is downloaded to mobile device 12. The data storage capacity of a mobile device 12 may determine how many match IDs are downloaded to it. In certain embodiments, if there is not enough data storage capacity to download all match IDs to a mobile device 12, then the match IDs may be prioritized, based on the relevance score of the match ID, the user associated with the match IDs, a geographical region associated with the match ID, tagged information associated with the match ID, among other things. Match IDs generated based on a common friend or resulting from specific affiliations, associations, or events may also receive high priority.

When a user profile 24 of a first user is compared with a user profile 24 of a second user to determine a match, the relevance scores for the users can be the same or different. In other words, the first user may be more relevant to the second user than the second user is to the first user. As an example, in a mentor/mentee relationship, the mentor is typically more valuable to the mentee and therefore may be more relevant to the mentee.

In certain embodiments, based on user preferences for example, data center 14 may block certain users from detecting each other in proximity. Two types of blocking include one-way blocking and two-way blocking. One-way blocking allows a first user to remain "invisible" (i.e., undetectable as a match in proximity) to a second user, but the second user may still be "visible" (i.e., detectable as a match in proximity) to the first user when the users encounter each other in proximity. Two-way blocking may cause each of the two users to be invisible to the other user.

In certain embodiments, data center 14 is operable to generate one or more identifiers (IDs) for a user. These IDs may include one or more of a client ID, a field ID, and one or more match IDs.

The client ID may include a public ID that may be broadcast from mobile device 12 and used by mobile devices 12 to detect a match in proximity. The client ID may be used to shield the true identity of the user, for privacy purposes for example. Alternatively, the client ID may simply be the user ID of the user, which in certain embodiments may reveal the true identity of the user.

The field ID may be included within a match ID (described below) to abstract specific data in a user profile 24 so that this specific data can be distributed inside a match ID to other, matched, users without disclosing the data that was input. For example, if data center 14 matched the user of mobile device 12a with the user of mobile device 12b, then when a detection event occurs between mobile devices 12a and 12b (e.g., the mobile devices 12 detect each other in proximity and recognize that they have been determined to be a match), the field ID may be used to display to the user of mobile device 12b the matched value from the user profile 24a of the user of mobile device 12a. A field ID for "University," for example, could be XML6463, and the value entered into that field by the user of mobile device 12a may be "Harvard." When a detection event occurs based on the field ID "XML6463" (e.g., the user of mobile device 12a and the user of mobile device 12b are within a predetermined or other suitable proximity and it is determined that both have specified "Harvard" as the value for "University"), "Harvard" may be displayed on mobile device 12b, for example. In certain embodiments, matches may be based on differences. Thus, data values triggered by identical field IDs may be different. In the above example, when the detection event occurs, even if the user of mobile device 12a has "Harvard" displayed for field ID "XML6463," the user of mobile device 12b may have "Stanford" or another value displayed.

The match ID may represent the results of data center 14 processing user profiles 24 to generate match data 26 (which may include match IDs) and may be synchronized to mobile devices 12. Among other functions, data center 14 may compare user profiles 24, calculate relevance scores, and generate match IDs based on the results of each comparison. In certain embodiments, a match ID is the result of a comparison between two user profiles 24 and may include one or more of the public client ID of the other matched user, a relevance score, a trust score, tagged information, a creation date, a modification date, a secured hash value (e.g., based on secure hash algorithm one (SHA-1), message digest algorithm five (MD5), or another suitable hash algorithm), and any other suitable information.

As a particular example, a match ID generated by data center 14 for a user of mobile device 12a (and possibly stored on mobile device 12a as match data 26a) may be the following:

4209032-4-6054-XML6463-8044-909033-842393-1214pm08052005-SHAq4309310912jd32js.

In this example, "4209032" is the client ID of another user (e.g., the user of mobile device 12b), "4" is the relevance score (e.g., representing how relevant the user 4209032 is to the user of mobile device 12a); "6054" is the trust score (e.g., representing how trusted the user 4209032 is among users of data center 14); "XML6463" is the field ID; "8044-909033-842393" represents the displayed value when a match occurs under field "XML6463," "1214pm08052005" is the creation date, and "SHAq4309310912jd32js" is the hash value for the user "4209032" that is generated by a SHA-1, MD5, or another suitable hash algorithm. This match ID is merely an example. The present invention contemplates the match ID including any suitable number of fields corresponding to any suitable information, according to particular needs.

Hashing may be used to authenticate a matched user and to prevent the unauthorized alteration of the match ID. Hash values may be generated by data center 14 for the users associated with the match ID (e.g., the user of mobile device 12a and user 4209032 in the above example). In certain embodiments, after the match IDs are generated, hash values are applied to the match IDs. Each user may receive the other user's hash value from data center 14 as a part of the match data 26 downloaded to the user's mobile device 12. When a match is detected between users of mobile devices 12a and 12b for example, a new hash value may be calculated on each of the user's mobile devices 12a and 12b. For example, mobile device 12a may calculate a new hash value for the match ID associated with the user of mobile device 12b and may send this new hash value to mobile device 12b to be compared with the original hash value that the user of mobile device 12b received from data center 14 for the user of mobile device 12a. This may allow a determination to be made with respect to whether the match ID has been altered. Although use of hash algorithms is primarily described, the present invention contemplates any suitable security mechanism to authenticate matched users and the unauthorized alteration of match IDs.

In certain embodiments, data center 14 is operable to download the generated match data 26 to appropriate mobile devices 12. For example, match data 26 for a particular user may be downloaded to a mobile device 12 associated with the particular user. In certain embodiments, match data 26 for a user includes the one or more match IDs generated for the user, along with any other suitable information. Match data 26 may be synchronized to a particular mobile device 12 at any suitable time during which the particular mobile device 12 is connected to network 16. This may help ensure that mobile devices 12 include the latest match data 26, which may account for new users or updates to existing user profiles 24 for existing users.

In certain embodiments, the match IDs generated for a particular user may be compressed into a match ID file and downloaded to the mobile device 12 of the particular user. For example data center 14 may compress the match IDs prior to downloading the match IDs to the mobile device 12 of the particular user. The file may include compressed extensible markup language (XML) text and binary streams that can be searched efficiently, as well as any other suitable data formats. In certain embodiments, the file compression is context independent, so that differential synchronizations may be implemented. In certain embodiments, once a mobile device 12 is synchronized with the information reserved for the associated user in data center 14, only subsequent changes are downloaded to the mobile device 12, so that the complete set of data is not required to be downloaded again. Additionally, the context-free nature of the file may allow modification to an individual XML stream, so that local modifications to the file (e.g., feedback, new reminder notes, or other features) may be entered into the mobile device 12 and uploaded to data center 14 during synchronization.

In certain embodiments, one or more optional features for a user's match ID file may be provided. For example, to increase search speed, more probable matches may be indexed and placed at the top of the file, so that they are more readily available. As another example, probable matches may be sorted by geographic proximity to the user associated with the file (e.g., if the user lives in Atlanta, then matches with others who live in Georgia are likely more probable than those living in Australia). As another example, probable matches may be sorted based on criteria such as: whether other users are attending the same conference or other event as the user associated with the file; whether other users frequently communicate with the user associated with the file; and whether other users have certain commonalities with the user associated with the file based on categories such as friendship, alumni status, zip code, industry, company, job function, or other suitable categories. As another example, the match IDs may be indexed by relevancy, so that the user associated with the file may be quickly notified of the most relevant matches. As another example, user profile masks such as professional and personal masks may be used to arrange the order of the file. A user profile mask may be specified by a user or otherwise indicated to filter which user profiles 24 are used to detect matches. For example, a user may have both a dating user profile 24 and a business user profile 24. When the user is at a business conference, the user may indicate that only matches detected based on the business user profile should be indicated to the user.

In certain embodiments, data center 14 is operable to collect other suitable information from mobile devices 12. For example, mobile devices 12 may generate usage information that may be communicated to data center 14. Usage information for a user may include the number of matches encountered in proximity, types of matches encountered in proximity, number of matched users messaged, length of messaging with a matched user, success of match, feedback to other users, and any other suitable usage information. Data center 14 may receive this usage information and store it in association with the appropriate one or more user profiles 24 in database 32.

In certain embodiments, using match data 26 (e.g., the match IDs) downloaded from data center 14, mobile devices 12 are operable to detect in proximity other mobile devices 12 that may be associated with a user who is a potential match. A user of mobile device 12 may launch a program on mobile device 12, such as application 20, which may interact with adaptor 18. Mobile device 12 may beacon data such as the client ID of the user associated with mobile device 12 (and possibly the user's availability level and other identification information, such as trust score and status). This beaconed data may be broadcast within any suitable range, depending on the technology being employed. As a particular example, this beaconed data may be broadcast within an approximately 300-foot range; however, the present invention contemplates this 300-foot range being extended or reduced, according to particular needs, depending on the particular protocol being used to detect other mobile devices 12 for example.

In certain embodiments, adaptor 18, possibly in association with application 20, may be operable to perform a number of functions. For example, adaptor 18 may enable a user to dynamically adjust the user's availability on mobile device 12, based on context or environment to control whether and when the user is notified of matches detected in proximity. For example, at a bar the user may be interested in being notified of business networking matches only on a particular occasion, but at a later time, the user may also be open to being notified of romantic matches. As another example, the availability level may be a value between zero and ten and may serve as a filter to notify the user only of match scores that are higher than the user's availability level. If the user attends an important meeting, the user may set the availability level to zero, which may cause the user not to be notified of any matches during the meeting. In certain embodiments, even though the user is not notified of the matches, the matches may be logged and stored on database 22 of the user's mobile device 12 as described below. After the meeting, the user may change the availability level from zero to seven, so that the user is notified of qualifying matches.

In certain embodiments, if a match is detected between a user of mobile device 12a and a user of mobile device 12b, for example, adaptor 18a may compare availability levels to determine if the availability levels are below the relevance scores. As an example, if the availability levels of the users are two and five, respectively, and the relevance scores for both users are six, then neither user is notified of the encounter. However, if both users change their availability levels to eight, which is greater than the relevance scores of six, then a match is confirmed. Subsequently, when the users are notified of the match, the match ID of each of the users may trigger the relevance score of the match for the user, the trust value of the other user, one or more commonalities (e.g., "Cornell University"), and any other suitable information to be displayed on the user's mobile devices 12a or 12b.

In certain embodiments, when a relevance score of a match detected in proximity is below the availability level of a user, the match may be logged on the user's mobile device 12, so that it can be reviewed by the user at a later time. The log may include the date and time the match was detected in proximity, the relevance score, the match ID, and any other suitable information. The log presents the user with missed matches, and enables the user to optimize the user's availability level for a given context or environment. For example, if a logged relevance score is five, the user may adjust his availability level from four to six. At that time, if the matched mobile device 12 is still present, a connection may be established between the matched users. It should be noted that, in certain embodiments, detected matches may be logged at any time, regardless of whether the user is open and/or available to receiving notifications of matches. This may include, for example, missed connections between matched users or other suitable situations.

In certain embodiments, availability settings may be associated with certain data sets or segments of users, such as those that are work-related or recreation-related. For example, a first user and a second user may share commonality in work, and the first user and a third user may share commonality in university attended. However, if the first user has selected a "work" user profile mask, then the adaptor 18 of the first user's mobile device 12 may broadcast a "work" availability level to filter matches that are not primarily work-related matches. Broadcasting a "work" availability level may cause the first user to be notified only of work-related matches and may instruct the adaptor 18 of other mobile devices 12 in proximity to only notify their respective users of a match with the first user if it is work-related. In this example, the first user may be notified of a match with the second user, but not with the third user (although the match with the third user may be logged, if appropriate). Thus, in certain embodiments, users may broadcast different masks to emphasize certain criteria and change them dynamically to suit a particular context or environment. In other embodiments, a user may filter non-work-related matches without broadcasting a work availability mask. For example, the user desiring a work-related filter may specify instructions, as part of his or her user profile 24 that could be included in the match ID, to instruct the adaptors 18 of other users to notify their users of a match only under certain circumstances, such as particular times of the day, days of the week, dates, SSIDs, or other suitable circumstances. In certain embodiments, a user may choose to be invisible to other users.

Moreover, in certain embodiments, a user of a mobile device 12 may use simultaneously multiple user profile masks. For example, the user may have three applications 20 or three user IDs running simultaneously on mobile device 12, each associated with one of the user's user profile masks. As examples, a first user ID may be the user's personal profile mask, a second user ID may be the user's work profile mask, and a third user ID may be the user's anonymous mask.

In certain embodiments, adaptor 18 may also "learn" which availability level or mask the user associated with its mobile device 12 prefers, so that the user does not have to manually adjust the availability level or user profile mask. Adaptor 18 may use any suitable criteria to determine the user's preferred availability level or user profile mask. For example, when the user uses a particular network, such as a company's internal WLAN, then the user may prefer work-related matches. Additionally or alternatively, adaptor 18 may determine the current active application (e.g., MICROSOFT POWERPOINT), as well as recently active applications, to determine whether the user is available for work-related matches (as opposed to recreation-related matches).

Other techniques for filtering matches detected in proximity are also contemplated by the present invention. For example, matches may be filtered by distance such that a user of mobile device 12 is only notified of matches that are within a predefined distance. This predefined distance may be less than the capable range of detection of the user's mobile device 12. A user may only wish to be notified of matches (i.e., users of other mobile devices 12 who are matches) that are at the same hotspot rather than those or are six or eight blocks away. As another example, matches may be filtered by time of the detected match in proximity. A user of mobile device 12 may wish to be notified of all matches that are currently in proximity or, instead, may wish to also be notified of all matches that were at the same hotspot but at different points in time (e.g., an hour before the user, a day before the user, or at any other suitable length of time).

Mobile devices 12 are operable to detect matches in proximity in any suitable manner, according to particular needs. In certain embodiments, the detection process may be used so that a user's mobile device 12 becomes aware that another client ID is on the same or a different network subnet and/or within wireless proximity.

In certain embodiments, Wi-Fi technology may be utilized to implement the detection process. In general, Wi-Fi may operate in an infrastructure mode or in an ad-hoc mode, each of which may be used by mobile devices 12 to detect matches in proximity. For example, the ad-hoc mode may allow Wi-Fi NICs to connect directly without infrastructure, as long as they both share an identical identifier, such as a SSID. The identifier (e.g., SSID) may be attached to header packets transferred over a Wi-Fi connection between mobile devices 12, and because two NICs with an identical SSID reside on the same logical network, the identifier may be used to differentiate among WLANs. In FIG. 1, links 28 illustrate example ad-hoc connections between mobile devices 12. Additionally or alternatively, in certain embodiments, BLUETOOTH-enabled mobile devices 12 may use BLUETOOTH technology to detect matches in proximity. For example, client IDs may be broadcast between BLUETOOTH-enabled mobile devices 12 on the same personal area network, or piconet, to enable pairing and service discovery on the same network.

In certain embodiments, adaptor 18 is operable to detect mobile devices 12 in proximity regardless of the network with which the other mobile devices 12 are associated. For example, if two mobile devices 12a and 12b reside on the same network (e.g., Ethernet, Wi-Fi ad hoc, Wi-Fi infrastructure, or BLUETOOTH), technologies such as TCP/IP service discovery may be utilized to detect relevant client IDs. If mobile devices 12a and 12b reside on different networks, these devices may detect each other in another suitable manner. Four example options are described below.

The first option is MAC address detection. As previously described, a user (e.g., of mobile device 12a) may be associated with one or more client IDs, which may identify the user publicly. As an example, the client ID of a user may be the unique MAC address of the Wi-Fi NIC of the user's mobile device 12. In certain embodiments, detection of this user may be accomplished as long as the mobile devices 12a and 12b are within a certain range of each other. If the user of mobile device 12a is associated with multiple Wi-Fi devices, then several MAC addresses may be used to identify that user.

In certain embodiments, mobile device 12a may use 802.11 frames to query wireless access points in proximity of mobile device 12a and obtain a list of MAC addresses. Adaptor 18a may obtain the MAC address of any ad-hoc nodes (e.g., wireless access points) in the vicinity and may use network "sniffing" technology at the 802.3 layer or MAC layer. Adaptor 18a may distribute requests at certain intervals for the MAC addresses and wireless access points in its vicinity.

Since, in certain embodiments, the availability level of other users (e.g., the user of mobile device 12b) is broadcast along with their client IDs, adaptor 18a of mobile device 12a may determine relevance by examining the client ID associated with mobile device 12b and the availability levels of both users. If a match is found and availability status is satisfactory, then the users of mobile devices 12a and 12b both may be notified, and a network layer communication may be established (e.g., using TCP/IP or another suitable protocol).

A second option is SSID detection. In certain embodiments, adaptor 18a may generate a unique identifier, such as an SSID or other ID, for the user of its associated mobile device 12a based on the user's client ID and availability level. Other mobile devices 12 (e.g., mobile device 12b) may detect mobile device 12a using the SSID of mobile device 12a. Once a desirable SSID is detected, either of mobile devices 12a or 12b may join the other's network, so that the two mobile devices 12a and 12b may establish a connection on the same network.

A third option is time-slicing to join and bounce between several networks. In certain embodiments, adaptor 18a may use NDIS and a WLAN driver to automatically associate mobile device 12a with both ad-hoc and infrastructure networks simultaneously, staying within the timeout threshold for a given network. Adaptor 18a may use NDIS calls to associate back and forth between ad-hoc mode (for detecting other users in proximity) and infrastructure mode (for accessing Internet resources), which may create virtualized simultaneous networks. "Time slicing" may be defined as bouncing between being associated with an access point for a certain period of time (e.g., milliseconds) and being in an ad-hoc mode for a certain period of time (e.g., milliseconds). Since, in certain embodiments, the detection process requires a certain amount of perhaps limited bandwidth, adaptor 18a may automatically "weigh" the amount of time it spends on each mode, so that resources may be economically distributed. In certain embodiments, the time-slicing technology used by adaptor 18a may also allow mobile device 12a to bounce between two or more infrastructure networks. For example, if mobile device 12a is connected to one network but uses resources of another network, mobile device 12a may appear to be connected to multiple networks simultaneously.

A fourth option is using separate network interfaces for each network, so that a mobile device 12 can be simultaneously connected to multiple networks (e.g., one per interface) without having to bounce between them. For example, a first Wi-Fi interface could join an infrastructure network and detect matches on that subnet, a second Wi-Fi network interface could be configured in ad-hoc mode, "beaconing" the client ID of its associated user, and a third BLUETOOTH interface could be available to pair BLUETOOTH users in proximity. As another example, a single mobile device 12 may be associated with multiple users. In this example, the mobile device 12 may include multiple network interfaces, each being associated with a corresponding user (e.g., a first user is associated with one or more Wi-Fi cards and a second user is associated with a BLUETOOTH card).

In certain embodiments, if the detection process occurs on separate networks, the users of mobile devices 12a and 12b may then be able to join the same SSID hardware-link layer and negotiate a network connection at the network protocol layer. For example, a ZEROCONF (i.e., an open standard often referred to as "Rendezvous" or "OpenTalk") TCP/IP-layer negotiation may be used to communicate and exchange further information and/or services at the network protocol layer.

In certain embodiments, mobile devices 12 may use a trust system when detecting matches in proximity. From the perspective of a user of mobile device 12a, when a match with a user of mobile device 12b is detected in proximity, a trust value for the user of mobile device 12b may be displayed on the mobile device 12a. The user of mobile device 12a may use this trust value to assess the level of integrity of the user of mobile device 12b to determine whether to meet or otherwise interact with the user of mobile device 12b. A trust level for the user 12b may be calculated based on one or more of the following: (1) the date the user became a registered user; (2) the total number of transactions performed by the user; (3) the number of successful transactions out of number of total transactions performed by the user; (4) the number of introductions by friends; (5) the number of successful introductions by friends; (6) the number of other users that list the user in their contacts lists; (7) the number of trusted affiliations to which the user belongs; (8) the date on which a portion of the user's profile 24 was created; and (9) any other suitable criteria. In certain embodiments, matches based on criteria that have been stored for a long time may be relatively more trustworthy.

It should be understood that, in addition to Wi-Fi, the present invention contemplates any other suitable wireless platforms, including but not limited to BLUETOOTH, ZIGBEE, WiMax, RFID, UWB, GSM, CDMA, a proprietary platform, cell tower triangulation, and GPS. Therefore, mobile devices 12 may detect one another using any suitable wireless platforms. Moreover, although MAC addresses and SSIDs are primarily described, the present invention contemplates use of any other suitable identifiers, such as cell tower IDs, according to particular needs. For example, cell towers in a wireless network may beacon cell tower IDs an other information that may be collected by data center 14 and used to detect users in proximity, to perform proximity determination, and for other suitable purposes. Additionally, although a 300-foot range is described as an example, a smaller or larger range is also contemplated for detecting other users in proximity. For example, a smaller or larger range may be used by detecting signal strength or using multi-hop networks. As a particular example, signal strength may be used to narrow the range of other users in proximity, filtering out matches that are farther away. Moreover, in certain embodiments, a user of a mobile device 12a may specifically notify data center 14 (and/or an operator of data center 14) of the user's location or of other user's of other mobile devices 12 that can by seen by the user of mobile device 12a.

Additionally, in certain embodiments, mobile devices 12 may be used as reference beacons in system 10 in a substantially similar manner to the manner in which network access points (e.g., MAC addresses and cell tower IDs) are used. As just one example, if a first mobile device 12a and a second mobile device 12b are both determined to be in proximity of the same BLUETOOTH mobile device 12c, then it may be assumed that mobile devices 12a and 12b are in proximity to one another.

In certain embodiments, to protect the privacy of users of mobile devices 12, access to user profiles 24 is limited. As described above, user profiles 24 are matched at data center 14 to create match data 26 that may be downloaded to the users' associated mobile devices 12. The match data 26 may be encrypted on mobile devices 12 and displayed only when a match user is detected in proximity. In addition, in certain embodiments, only the information that the two matched users share in common may be displayed on a user's mobile device 12. For example, a first user may be interested in gardening and may choose to share only his gardening user profile (but not other user profiles of his) with other users who are also interested in gardening. The present invention contemplates sharing any suitable amount of a user's profile 24, according to particular needs. In certain embodiments, a user may specify the amount of the user's one or more user profiles 24 the user would like to share. For example, the user may be open to sharing more information from one or more of the user's one or more user profiles based on the location of a detected match, the type of detected match, the time of day the match is detected, one or more network identifiers detected at the time of the detected match, or any other suitable information. As a particular example, a user at a business conference may be willing to share greater information from the user's business user profile 24 if a match is detected at one or more MAC addresses of one or more networks existing at the conference. The information displayed when a match is encountered may be displayed using a display of application 20, in a browser, or in any other suitable manner.

In certain embodiments, mobile devices 12 are operable to communicate with one another once a match has been detected in proximity. For example, adaptor 18a may use extensible messaging and presence protocol (XMPP) to relay XML-based messages and presence information between the user of mobile device 12a and the mobile device 12 of a matched user (e.g., mobile device 12b). If both users are interested in the match, mobile devices 12a and 12b may use the XMPP-enabled adaptor 18 to message anonymously within their ad-hoc wireless network to determine a meeting place or other venue for interaction. In certain embodiments, the messaging platform may function similarly to a decentralized instant messenger system. Following the establishment of the ad-hoc network, adaptor 18a may use the TCP/IP protocol to create a messaging connection between mobile devices 12a and 12b. Other messaging mechanisms, such as short-range radio technologies, Wi-Fi, BLUETOOTH, short messaging services (SMS), voice over Internet protocol (VoIP), push-to-talk, cellular telephone, voicemail, video conferencing, or other suitable mechanisms may also be used.

FIG. 2 illustrates an example method for providing communication services to users of mobile devices 12. According to the example method illustrated in FIG. 2, potential matches are pre-processed at data center 14 and downloaded to mobile devices 12. As a result, when users of mobile devices 12 detect each other in proximity, the users are able to determine whether they are a match based on information stored in their respective mobile devices 12. Accordingly, the users may communicate with each other substantially immediately or at a later time to facilitate potential meetings or other interactions.

At step 100, a user of mobile device 12a submits a user profile 24a to data center 14. For example, the user may access data center 14 and complete a user profile online. As another example, the user may download a file that includes a user profile form, complete the form while offline, and submit the form to data center 14 at a later time when the user is connected to network 16. As another example, the user may print or otherwise acquire a copy of a user profile form, complete the form by hand, mail the form to an appropriate recipient for entry into data center 14. Users may enter user profile information using a corresponding mobile device 12 (i.e., mobile device 12a in this example); however, the present invention contemplates a user entering or modifying user profile information in any suitable manner, according to particular needs. For example, a user may access his account using a device other than the user's mobile device 12 that can access network 16. In certain embodiments, a user may also download and install application 20 on the user's mobile device 12. This step may occur prior to or after the user completes user profile 24a.

At step 102, data center 14 pre-processes the received user profile 24a. In certain embodiments, data center 14 may store received user profile 24a in database 32. Data center 14 pre-processes the information provided by the user in user profile 24a to generate match data 26 for the user associated with user profile 24a. For example, data center 14 may compare user profile 24a to all or a selected subset of other user profiles 24 stored in database 32 and may generate one or more match IDs based on the comparison. In certain embodiments, match data 26 generated in response to user profile 24a may include match data 26a, identifying any users with whom the user associated with user profile 24a is matched, and other match data to be distributed to those users with whom the user who submitted user profile 24a was determined to be a match.

At step 104, data center 14 distributes the generated match data to one or more appropriate mobile devices 12. In certain embodiments, certain mobile devices 12 may request "synchronization" from data center 14. For example, a user of mobile device 12 may log onto his or her account at data center 14 and request synchronization, which may include downloading the most current match data 26 for the user. As another example, mobile device 12 may be configured to automatically request synchronization when a user logs onto data center 14 or at any other suitable interval. Match data 26a generated in response to user profile 24a may be synchronized to mobile device 24a, other mobile devices 12 whose associated users were determined to be a match with the user who submitted user profile 24a, and any other suitable users, according to particular needs. Match data 26a may be stored in memory module 22a in any suitable format, according to particular needs.

At step 106, the user of mobile device 12a launches application 20 on mobile device 12a. Application 20, possibly in cooperation with adaptor 18a, may attempt to detect other mobile devices 12 in proximity to mobile device 12a. Using match data 26a (e.g., the match IDs) downloaded from data center 14, mobile device 12a may be operable to detect other mobile devices 12 that may be associated with a user who is a potential match. Mobile device 12a may beacon data such as the client ID of the user associated with mobile device 12a (and possibly his availability level and other identification information, such as trust score and status). This beaconed data may be broadcast within any suitable range. As a particular example, this beaconed data may be broadcast within an approximately 300-foot range; however, the present invention contemplates this 300-foot range being extended or reduced, according to particular needs. Mobile device 12a may also listen for data being beaconed by other mobile devices 12.

At step 108, mobile device 12a determines whether a match is detected in proximity. As described above with reference to FIG. 1, mobile device 12a is operable to detect matches in any suitable manner, according to particular needs. The detection process may be used, for example, so that a user's mobile device 12 becomes aware that another client ID is on the same or a different network subnet and/or within wireless proximity. Additionally, as described above, users may be matched for any suitable purposes, according to particular needs. In certain embodiments, when mobile device 12a detects another client ID (or other suitable identifier indicating a potential user of system 10), mobile device 12a may consult match data 26a to determine whether the user associated with the detected client ID is identified in the match data 26a for mobile device 12a.

If a match is not detected at step 108, then at step 110, a determination may be made regarding whether a termination event has occurred. A termination may include power off of mobile device 12, termination of application 20, or any other appropriate reason for termination. If a termination event has not occurred at step 110, then the method may return to step 108 to continue checking for matches in proximity. In certain embodiments, mobile device 12a attempts to detect matches at a suitable interval (e.g., substantially continuously) until a termination event occurs. If a termination event occurs at step 110, then the method may end.

If a match is detected at step 108, then, at step 112, communication between matched users of mobile devices 12 may be established. In certain embodiments, if a match is determined, then mobile device 12a may notify its associated user of the match. As described above, whether or not the user is notified may depend on a number of factors, such as a comparison between the relevance score for the match and the availability setting for the user of mobile device 12a. If a match is detected and the user of mobile device 12a is notified of the match, the user of mobile device 12a may initiate communication with the mobile device 12 of the matched user. Additionally or alternatively, the other user associated with the match may initiate communication with the user of mobile device 12*a*. At step 114, usage information may be uploaded to data center 14. For example, after an encounter, which may include detection of a match or messaging between matched users for example, usage information may be uploaded to data center 14.

Returning to step 110, a determination may be made regarding whether a termination event has occurred. If a termination event has not occurred at step 110, then the method may return to step 108 to continue checking for matches in proximity. In certain embodiments, mobile device 12*a* attempts to detect matches at a suitable interval (e.g., substantially continuously) until a termination event occurs. If a termination event occurs at step 110, then the method may end.

Returning to FIG. 1, one or more additional features may be implemented using system 10. Examples of these additional features are described below.

Match Categories for User Profiles 24

In certain embodiments, user profiles 24 may include one or more match categories. Each match category may have its own section in user profiles 24, which may allow users to select which categories they want to complete. In certain embodiments, double-entry may be avoided by having links in several sections to the same data. In a particular example, users may choose to be matched based on one or more of the following nine categories that may each be as granular as the user desires: (1) Background, (2) Hobbies/Interests, (3) Organizations, (4) Friends and Acquaintances, (5) Business Networking, (6) Dating, (7) Networking Goals, (8) Market (buy/sell items, free agent services), and (9) Employment. Although these categories are primarily described, the present invention contemplates user profiles 24 including fewer or more categories, according to particular needs. Moreover, although these nine categories are described below, the present invention contemplates user profiles 24 being organized in any suitable manner and including any suitable information, according to particular needs.

User profile 24 may include a Background section, which may include information regarding countries, states, cities and/or neighborhoods lived, schools attended, fraternities/sororities, military service, social clubs, summer camps attended, or any other suitable background information.

User profile 24 may include a Hobbies/Interests section, which may drill down interest categories to a suitably granular level, allowing users to match based on a particular band, a favorite movie or sports team, a type of collection, or any other suitable hobbies or interests.

User profile 24 may include an Organizations section, which may allow users to specify one or more organizations of which they are members. The Organizations section may allow users to be matched based on membership, regional chapter, dates/times in an organization, or any other suitable level of granularity.

User profile 24 may include a Friends and Acquaintances section, which may allow users to specify their friends and acquaintances and for matches to be determined based on those relationships (e.g., friends of friends). In certain embodiments, the unique user ID may be generated based on a user's email address, which may facilitate adding friends and acquaintances to a user's profile 24. For example, adding friends and acquaintances may include uploading a list of email addresses.

In certain embodiments, users may be able to connect their friends and acquaintances together when such friends and acquaintances are nearby one another, which may add a new dimension of networking. For example, a user may be able to un-intrusively connect two of the user's contacts when there is no immediacy or pressing need to connect them, which may create a new social dynamic. This capability may enable two individuals to meet, even though the common connector (e.g., the user who included both of the individuals in his friends and acquaintances) is not present. The user the two individuals share in common may enter notes with respect to each of the individuals, which may be used to provide a contextual introduction for the individuals being matched. In addition to being notified of the common user shared by the two individuals, the two individuals may be informed of any other commonalities they share. In certain embodiments, as described in more detail below with respect to the section entitled Friend-of-a-Friend Matching in Substantially Real Time, the common friend may be online when the two individuals meet, may be notified of the proximity of the two individuals, and may arrange a meeting between the individuals in any suitable manner.

User profile 24 may include a Business Networking section, which may allow users to leverage business networking capabilities of certain embodiments of system 10 both before and after conversations with their contacts. Users may be able to enter relevant notes and facts about each of their contacts in a short text field (e.g., per contact). These notes may include information such as when and where they last met, who introduced them, details of their last conversation, birthdays, names of children, recent promotions, or other suitable information, such as tagged information described below. When a contact is detected by a user's mobile device 12 (e.g., the mobile device 12 of the contact is in proximity to the mobile device 12 of the user), application 20 may remind the user of the relevant facts about the contact by displaying this text field. Before or after a conversation resulting from the detection, the user can add any new notes to the text field to be reminded about for a next encounter.

User profile 24 may include a Dating section, which may allow users that are interested in dating other users to enter information related to dating. For example, the Dating section may include questions regarding the type of mate the user is seeking, a personality user profile, questions regarding the user's dating goals, and any other suitable questions. Users may enter their favorite bars, restaurants, wireless network hotspots, or other suitable information. Users may enter a dating key-phrase to authenticate two-way matches. For example, a dating key-phrase may include "Georgie and Cosie," "Casablanca," "Are you the Gatekeeper?," "Follow the White Rabbit," or any other suitable key-phrase. A user may upload a picture of the user that may be included in the Dating section (or any other suitable section).

Data center 14 may use this dating-specific information, along with the rest of a user's profile 24, to determine matches specifically designed for dating. After data center 14 has compiled a list of appropriate possible dating matches, a user can be prompted to view pictures of those possible dating matches. Since some physical attraction is a key requirement for assessing chemistry with a potential mate, users may have the ability to filter their pool of potential matches by selecting those that they find the most attractive.

As an example, a particular user may select a city (e.g. from a drop-down box) in which the particular user would like to find dating matches. The particular user may select the relevance score with which the user would be open to being matched (e.g., the particular user could scroll through relevance score levels 1-10). The particular user may then submit this information, and the pictures pertaining to the selected city and relevance score may appear. In certain embodiments, pictures may be grouped in one or more of the following groups: all matches; two-way matches; one-way matches; unchecked matches; and blocked matches. The particular user may select which group to view (e.g., all matches). In certain embodiments, only the pictures and other suitable information of determined matches are provided to the particular user.

Alternatively, additional information from the user profiles 24 of potential matches may be provided to the particular user. As an example, the particular user may select another user for dating by clicking on a check box or radio button below each picture to indicate that the user finds the other user attractive based on the picture. This selection action may increase the relevance score for the selected potential matches. For example, if Steve selects Mary's picture but Mary has not selected Steve's picture, then Steve may have a higher relevancy score for a match with Mary than she would have for a match with Steve.

In certain embodiments, a user may be able to block a match from occurring with someone the user does not want to meet or otherwise interact with based on the picture. For example, to block a match from occurring, a user may click on a "Block" checkbox or radio button underneath the picture of the matched user. In certain embodiments, blocking a user may prevent a match from occurring with respect to the blocked user, regardless of what the relevance score would have been. In response to a blocking indication, data center 14 or another suitable component of system 10 (e.g., application 20) may create a new relevance score for the match of eleven, which may be downloaded as part of the match IDs to both user's mobile devices 12 (e.g., during synchronizations between the mobile devices 12 and data center 14). As a result, the users may be "invisible" to each other such that they are not notified of each other even when they are detected in proximity, at least not for dating purposes.

In certain embodiments, a first user may be able to access his user profile Dating section to view which other users have selected him. In addition to being able to view which other users have selected the first user, the first user may be able to either select the other user as well or block a match from being detected in proximity. As an example, if the first user and a second user have selected one another for dating (e.g., two-way selection), then one or more text fields may be displayed adjacent to the pictures of the first and second users. The text fields displayed to each of the first and second users may provide additional information regarding the other user, such as additional information provided by each of the first and second users in their respective user profile Dating section (e.g. favorite bars, restaurants, wireless network hotspots, or other suitable information). This additional information may increase the opportunity for a determined match between the first and second users who have indicated an interest in each other (e.g., by two-way selection).

In certain embodiments, the first user's dating key-phrase may be displayed to the second user below the first user's picture, and the second user's dating key-phrase may be displayed to the first user below the second user's picture. The dating key-phrase may be used to authenticate a match determined match. For example, when the two users meet or otherwise interact, the users may recognize one another from their respective pictures and may introduce themselves by saying the other's dating key-phrase. This capability may provide an enhanced level of security and comfort to the two users, knowing that the users were matched using system 10 and that they have two-way selected one another.

Although in the above example, only each user's picture and dating key-phrase were displayed to the other user, the present invention contemplates displaying any other suitable information to the users. For example, the relevance score, trust value, commonalities shared, and any other suitable information may be displayed to the first and second users. In certain embodiments, if the first user would like to confirm a two-way selection or has forgotten the second user's dating key-phrase, then the first user may use any device (e.g., a mobile device 12) with the ability to connect to network 16 to access the Dating section of the first users' profile, providing the ability to view the pictures, corresponding dating key-phrases, and other information as appropriate. In certain embodiments, a user may connect two contacts for dating purposes in a similar manner to that described above with respect to business networking.

User profile 24 may include a Networking Goals section. For example, users may be able to indicate a wish list of people they would like to meet. As a particular example, a user may indicate that he or she would like to meet a lawyer, an engineer, an anthropologist, a fashion designer, or someone from Italy. This capability may provide a technique for building a network of friends or acquaintances that may live in different "worlds" than the user. In certain embodiments, users may use the networking goals feature to find roommates in a new city, find a babysitter that works for a friend (or a friend of a friend), or for other suitable purposes. Additionally, in certain embodiments, system 10 provides a "find more like these" feature, which may allow users to find additional contacts based on a current list of acquaintances. For example, a user may be able to find friends similar to existing friends, girlfriends similar to ex-girlfriends, or other suitable contacts. The Networking Goals section may allow a user to look for other users that have expertise or experience in certain areas. The Networking Goals section may allow a user to type in another person's Internet alias from a website on which the user has enjoyed the other person's posts to potentially set up a meeting or other interaction with the person. As another example, users may input or integrate genealogy information from family tree software to be matched to relatives.

User profile 24 may include a Market Information section for gathering information for exchanging goods and services. For example, users may be able to select categories of items they are interested in buying. As another example, users may be able to browse items for sale by other users of system 10. Using system 10, a user may be able to categorize items the user would like to sell and enter short text descriptions of the items. The items may then be available for other users to browse and consider.

User profile 24 may include an Employment section. For example, users may be able to input resume information and information regarding the types of jobs they are seeking Job posters may be able to select criteria for the type of job they are trying to fill, which may allow managers and recruiters to meet potential candidates directly as they go about their routine, potentially reducing or eliminating the need for middlemen such as headhunters and allowing a manager to play a more active role in the hiring process if desired. In certain embodiments, a company can synchronize these job descriptions to employees in the company, which may allow multiple employees to participate in the identification of potential job candidates.

Tagging Information

In certain embodiments, system 10 supports connections based on tag information, which may allow certain users of mobile devices 12 to be tagged as a match even if their user profiles may not otherwise result in such a match. Information may be tagged to one or more mobile devices 12. The tag information may be included in the match ID and synchronized to the user's mobile device 12.

A user may tag information to particular users. For example, a first user may tag information to be displayed on a second user's mobile device 12 when the second user encounters a particular match (e.g., a third user). A user may be able to tag "notes" to be displayed to the user when another user (e.g., someone listed in the user's acquaintances) is detected in proximity. This may help the user remember any relevant names or other information (e.g., how the user knows the other user) when the user encounters acquaintances, possibly facilitating business networking. Since users may not always be able to recognize some of their contacts, particularly those that they may have met in person only once or those that they have not seen for some time, the present invention may notify the users when their contacts are nearby and provide relevant information, which may enable users to build on existing relationships. In certain embodiments, a user may tag information to a networking goal to meet a specific person. For example, if the user encounters that specific person, the tagged information may be displayed on that user's device.

In certain embodiments, a user can tag information to multiple users. For example, a user may link two of his friends or acquaintances by "introducing" them with a note. The "introduction" message may be tagged to both acquaintances' mobile devices 12, so that the message will be displayed on their mobile devices 12 when they detect each other in proximity. The matches may be pre-processed at data center 14 for the common friend, and the introduction message may describe the purpose of matching them and include any other suitable information.

As a particular example, this introduction message may tag the acquaintances' mobile devices 12 with the introduction message, so that the message may be displayed on their mobile devices 12 when they detect one another in proximity. This may allow the two acquaintances to meet or otherwise interact with each other even if the common friend is not present. This capability may extend a user's networking reach because the user is essentially present wherever the user's friends are. In certain embodiments, the matches are pre-processed for the common friend at data center 14 and are sent to the acquaintances' mobile devices 12 as part of their match data 26, along with a note indicating the reason the two should meet. For example, the common friend could detail the purpose of matching the two users and describe each of their backgrounds or how the user knows them. As another example, if a user moves to a new city where the user does not know many people, a common friend could electronically introduce the user to all of the common friend's friends and acquaintances in the new city.

As a particular example, a user may tag connection information to multiple other users in the user's profile. The user may highlight the names of two friends in the user's Contacts list, click on a "Create Tag Connection" or other suitable button, and enter an introduction message in the provided tag connection field. This introduction message may be displayed to the two contacts when they encounter each other.

In certain embodiments, a user may tag information to a networking goal to "introduce" the user to any number of people that could fulfill a specific networking goal. For example, if a user seeks someone that has Wi-Fi expertise, the user can tag a message to anyone with Wi-Fi expertise that the user detects in proximity. The message could read, for example, "Considering starting Wi-Fi company. Want to learn about Wi-Fi/BLUETOOTH interference issues." In this example, a Wi-Fi expert that encounters the user may receive the tagged message, along with a relevance score, trust value, and commonalities, and the expert could decide whether to meet or otherwise interact with the user.

A user may tag "notes" to himself to be displayed when a particular match or other person is encountered. In certain embodiments, to be reminded about the "notes" when encountering the particular match or other person, the user may highlight the name of the particular match or other person, click on a "Create Tag Reminders" or other suitably-named button, and enter a message regarding the particular match or other person that is to be displayed when the particular match or other person is detected in proximity. In certain embodiments, the tagged information is only displayed on the user's mobile device 12, as opposed to the particular match or other person's mobile device 12. Additionally or alternatively, when a user enters a new contact into the user's profile 24, the user may enter text regarding the new contact and select to be reminded about that information the next time the new contact is detected in proximity. In certain embodiments, to tag multiple contacts, a user may highlight or otherwise select each of the contacts or a contact group (e.g., Cornell University Friends, Dallas Friends, or High School Friends).

A user may also tag information to a networking goal to meet a particular person, so that when the user encounters the particular person, the tagged information will be displayed on that particular person's mobile device 12. Tag connection information for a user's networking goals may be entered in the Networking Goals section of the user's profile 24. A user may enter a networking goal (e.g., meet Wi-Fi expert) and select a tag connection button to enter a message in the tag connection field adjacent to the networking goal. This feature may be used to "introduce" the user to the Wi-Fi expert before meeting in person.

In certain embodiments, a user may submit one or more keywords that explicitly state characteristics for which the user is looking to find in a match. These keywords may be included in an "active search list" for the user. The active search list may be included in one or more user profiles 24 of the user. For example, a first user may specify a particular keyword in an active search list for the first user. In certain embodiments, when a second user is detected proximity of the first user and a match is determined based on the particular keyword (e.g., the keyword is found in the second user's profile), one or more of the first and second users may be notified of the match. Additionally, in certain embodiments, the first and second users may be notified that the match occurred based on an active search keyword.

In certain embodiments, a user may tag particular locations based on hardware signatures such as network identifiers (e.g., MAC addresses) associated with one or more networks at the location. For example, based on MAC addresses or other hardware signatures, particular locations can be tagged with useful information by users of mobile devices 12. This tagged information may be stored at data center 14 and presented to a user on his associated mobile device 12, by application 20 for example. In certain embodiments, this tagged information may alternatively or additionally be made available online, through data center 14 for example. In certain embodiments, tagged information for a particular location may be pre-populated with a default value of the SSID being broadcast by that location (e.g., "T-MOBILE" or "RADISSON Wireless"). A user may be able to add tags to this default tag that may include more useful information about the location, such as "CES-ConferenceRoom4," "MainStreetCafe," "DFWAirport-Terminal3," or other suitable keywords. This additional tagged information may provide a more relevant descriptor for the location than the default tag assigned based on the SSID. The user may be able to categorize the location using a pull-down menu of available categories or other suitable mechanism. For example, a location may be categorized as a location as a hotel, coffee shop, airport, or any other suitable category. In certain embodiments, tagged information for a location may be shared with other users who use the location to provide context for the other users' detected matches at the location, and may be used for a variety of other purposes.

Tagged information may be entered in any suitable manner, according to particular needs. In certain embodiments, tagged information may be entered using applications 20 on mobile devices 12, using a web browser, or in any other suitable manner. The text may be assigned to one or more appropriate users (e.g., one or more appropriate contacts) to be triggered when one or more of these users are encountered. As an example, if a first user, John, entered tagged information to be triggered when a second user, Mary, encounters a third user, Steve, then the tagged information may be synchronized to both Mary's and Steve's user profiles 24 in a "hidden" section that cannot be viewed by Mary or Steve unless the encounter occurs (e.g., unless a detection in proximity occurs with respect to Mary and Steve). In this example, John may view and edit the entered text, but the users who are assigned the text (e.g., Mary and Steve) cannot view the text until they encounter one another.

Friend-of-a-Friend Matching in Substantially Real Time

In certain embodiments, a first user may be able to introduce second and third users who are nearby one another even when the first user is not nearby the second or third users during the encounter. For example, the second and third users may be listed in the first user's contacts. If the second and third users are nearby one another and the first user is online or available via SMS, the first user may be notified that the second and third users are currently near one another and asked if the first user would like to introduce the second and third users. In certain embodiments, when a user is online, the user may be notified when the user's contacts come within proximity of one another. The user may be able to customize an introduction message to send to each of the users. In certain embodiments, the user may host a group chat, inviting the two contacts so that the three users may converse (e.g., via email or instant messaging). This friend-of-a-friend introduction technique may allow a user to introduce contacts such as friends and acquaintances in substantially real time, even when the user is not present.

Decentralized Distribution of Application 20

As described above, application 20 installed on mobile devices 12 may provide certain functionality associated with the operation of system 10. In certain embodiments, the present invention allows users of mobile devices 12 who have installed application 20 to distribute copies of application 20 to other users of other mobile devices 12 who have not installed application 20, which may allow the other users to access one or more features of system 10. Distribution of application 20 in such embodiments may be decentralized in that the users who desire to install application 20 may not have to access data center 14 or another centralized node (e.g., a web site associated with the proprietor or other entity supporting system 10) to install application 20. Thus, rather than requiring users to be online and logged into a particular web site (e.g., a web site associated with the proprietor of system 10), in certain embodiments, the present invention enables users to obtain application 20 from other mobile devices 12. In addition to providing the other users with access to one or more features of system 10, decentralized distribution of application 20 may also provide advantages to the proprietor of system 10 by easing distribution of application 20 and encouraging greater use of system 10. Thus, in certain embodiments, system 10 leverages existing users, mobile devices 12, networks, and servers or other computer systems that may be installed in different locations to allow users to obtain and install application 20 through various channels. Although distribution of application 20 is primarily described, the present invention contemplates distribution of any suitable applications in this decentralized manner.

In certain embodiments, each user may host a localized web page, providing a link for others to select to see what the users share in common without consulting data center 14 or even being on the Internet. For example, rather than requiring a user to log into data center 14 to complete a user profile 24, which would be compared with other user profiles 24 at data center 14 to generate match IDs to be synchronized to the user's mobile device 12, the present invention may allow the user to answer user profile questions that another user is hosting on the other user's mobile device 12. Users may be able to host predetermined questions supplied by data center 14 or application 20 or may create their own questions for others to answer.

In certain embodiments, application 20 may be operable to propagate itself to users who do not yet have application 20 installed. In certain embodiments, this propagation may be performed in ad-hoc mode, using a local subnet service-discovery mechanism such as ZEROCONF, or in any other suitable manner.

In ad-hoc mode, in certain embodiments, application 20 may beacon an SSID of "proprietor_name.net" (e.g., where "proprietor_name" corresponds to the name of a proprietor of system 10). When a first user of a mobile device 12 who is in proximity of a second user of application 20 on another mobile device 12, the first user's mobile device 12 may perform an SSID scan to browse the list of available networks in proximity of the first user. If the first user's mobile device 12 associates to the "proprietor_name.net" SSID, then upon trying to go to a website (e.g., www.google.com), the first user may be routed to a web page that is stored on the second user's mobile device 12. For example, the first user may be routed using standard TCP/IP networking (e.g., using the default TCP/IP route that resolves any name to a web server hosted locally by the application 20 that is beaconing the proprietor_name.net SSID) or any other suitable protocol. Potentially, many if not all domain name server (DNS) resolutions may point directly to the local web server contained within application 20. This web page may describe the services available using system 10 and may invite and enable the first user to download application 20 directly from the second user's mobile device 12 to the first user's mobile device 12.

As an example, suppose a first user, John, is running application 20 in ad-hoc mode. John's mobile device 12 may also be running a small web server inside application 20. Suppose a second user, Mary, connects to the proprietor_name.net SSID that John's mobile device 12 is hosting and attempts to access the Internet. In certain embodiments, a predetermined web page will be displayed on Mary's mobile device 12, which may describe the services available using system 10 and may invite and enable Mary to download application 20 directly from John's mobile device 12 to her mobile device 12.

In certain embodiments, even if ad-hoc mode is not being used, application 20 may still be used to host a webpage on the local subnet of a mobile device 12, which may be used to distribute application 20. For example, ZEROCONF or another suitable detection protocol may be used to discover web pages on the local subnet of a mobile device 12, which may route a user to another user's web page stored inside of the other user's application 20. Additionally, a web site that is hosted by a first user running application 20, which may show what other users around the first user share in common with the first user, may be linked directly to application 20. This may allow other users who are using the first user's web page to change their taglines and to communicate with other users who are using application 20. In essence, the particular user acts as a router between local web-based users who have not yet installed application 20 and those users who have.

Personal URL

In certain embodiments, data center 14 or another suitable component of system 10 may assign each registered user of system 10 one or more personal URLs. The one or more personal URLs for a user may be stored in or otherwise associated with a user profile 24 of its associated user. Users may use their URLs in a variety of ways. For example, a user may insert the URL into the user's digital signature for emails, place it on web logs or other web sites, place it on business cards, or use it for any other suitable purpose. As another example, a first user may include the URL on a web server that other users in proximity (e.g., using ZEROCONF or another suitable detection protocol) may use to see what they share in common with the first user. In certain embodiments, when another user types the URL into a web browser, the user may be able to view what he or she shares in common with the first user associated with the URL. This capability may allow users to determine what they share in common with other users, without requiring that the users be in proximity of one another, and possibly provides anonymity to one or both users.

FIG. 3 illustrates an example method for assigning and processing a personal URL according to certain embodiments of the present invention. At step 300, data center 14 may receive a user profile 24 for a first user. At step 302, data center 14 may generate a personal URL for the first user. In certain embodiments, the generated URL for the first user may be based on the first user's client ID, described above, although the present invention contemplates the URL being in any suitable format, according to particular needs. For example, the URL for the first user may be www.proprietor_name.net/clientid_82740AF3RT432. In certain embodiments, a user may be assigned or otherwise request multiple personal URLs to be distributed to different people. For example, a user may have a business personal URL, a dating personal URL, a friends personal URL. Each personal URL may include an introduction message for the intended recipients of the URL.

At step 304, data center 14 may receive a connection request from a second user, the connection request originating from the URL of the first user. In certain embodiments, the second user may simply click on the URL of the first user and be routed to a web site hosted by data center 14 (and possibly the proprietor of system 10), for example. The present invention contemplates the second user gaining knowledge of the first user's URL in any suitable manner. For example, as described above, the first user may have inserted the URL in the first user's digital signature for emails, placed the URL on a web log or other web site, placed the URL on business cards, or otherwise made the URL available.

At step 306, data center 14 may determine whether the second user is a registered user of system 10. If data center 14 determines at step 306 that the second user is a registered user of system 10, then at step 308, data center 14 or another suitable component of system 10 may determine whether the mobile device 12 of the second user is storing an appropriate cookie associated with system 10. The cookie may include the client ID or another suitable identifier of the second user that may be used by data center 14, possibly in cooperation with application 20, to identify the cookie. If at step 308 data center 14 or another suitable component of system 10 determines that the mobile device 12 of the second user includes an appropriate cookie, then at step 310, data center 14 or another suitable component of system 10 may, using the client ID stored in the cookie, automatically log the second user into data center 14.

At step 312, data center 14 may retrieve appropriate match data for the first and second users, and at step 314, the mobile device 12 associated with the second user may display appropriate commonalities for the first and second users, if any. In certain embodiments, the commonalities or other suitable information may be displayed in a web browser of the mobile device 12 associated with the second user. In certain embodiments, the first user may also be notified that another user has accessed the first user's URL. In certain embodiments, the second user may be able to view all of the commonalities with the first user. Alternatively, the second user may only be able to view certain commonalities. Additionally or alternatively, the second user may be able to view one or more commonalities, as well as one or more other types of information (e.g., differences between the user profiles 24 of the first and second users, certain information from the first user's profile 24, or any other suitable information).

In certain embodiments, as described above with reference to tagged information, introduction messages may be displayed, if appropriate. For example, the second user may be able to view introduction messages that common friends of the first and second users have written specifically for the first and second users. As another example, if the second user shares certain aspects of the second user's profile 24 (e.g., a networking goal of meeting other users interested in Wi-Fi), if appropriate, the second user may receive a particular introduction or endorsement message (e.g., indicating that the first user would like to start a Wi-Fi software company and is looking for Wi-Fi developers).

In certain embodiments, friends or acquaintances of the first user may leave introduction messages for the second user or for other users who may share something in common with the first user. For example, the first and second users may both be single, so a friend may leave an introduction message that comments positively on the first user's personality. In certain embodiments, if the first and second users share a common friend, the common friend may have left an introduction message indicating to the second user that the second user should meet or otherwise interact with the first user. Additionally or alternatively, the second user may be able to view any other suitable information about the first user that is provided by data center 14 (e.g., the number of connections the first user has made, the rating of the first user indicating how other users have rated their interactions with the first user, or a value, reference bar, or other indicator indicating how relevant the first user is to the second user). In certain embodiments, a friend may distribute a user's personal URL so that other users may be able to determine if they are a match with the user.

In certain embodiments, system 10 may use any suitable security mechanisms to protect users who are located at a public terminal, such as time-delayed automatic signoff, a checkbox at login for use on a public terminal, or any other suitable mechanism. These security mechanisms may be particularly desirable in situations when users are automatically logged into data center 14 in a public location.

Returning to step 308, if data center 14 or another suitable component of system 10 determines that the mobile device 12 of the second user does not include an appropriate cookie, then at step 316, data center 14 or another suitable component of system 10 may prompt the second user to log into data center 14. For example, the second user may be routed to a login web page hosted by data center 14. At step 318, assuming the second user communicates login information to data center 14, data center 14 may attempt to authenticate the second user and log in the second user if the authentication is successful. After a successful login, the method may return to step 312. As described above, at step 312, data center 14 may retrieve appropriate match data 26 for the first and second users. For example, based on the login information provided by the second user, data center 14 may look up the second user's client ID and the match ID associated with the first user to determine what, if anything, should be displayed to the second user (e.g., commonalities with the first user or other suitable information). At step 314, the mobile device 12 associated with the second user may display appropriate commonalities regarding the first and second users, if any.

Returning to step 306, if data center 14 or another suitable component of system 10 determines that the second user is not a registered user, then at step 320, data center 14 may prompt the second user to register with data center 14 in any suitable manner. For example, data center 14 may prompt the second user to complete one or more user profiles 24, such as user profiles 24 that are similar to the user profiles 24 completed by the first user if possible.

In certain embodiments, each user may store on his or her associated mobile device 12 of the user profile questions associated with the user profiles 24 filled out by the user. In such embodiments, if the second user is determined not to be registered with system 10, then the second user's mobile device 12 may communicate with the first user's device (e.g., using the personal URL of the first user) to request and receive the user profile questions filled out by the first user. In certain embodiments, the may allow the second user to receive the user profile questions filled out by the first user without communicating with data center 14.

At step 322, data center 14 may determine whether the second user chose to register with data center 14. For example, data center 14 may determine whether the second user submitted one or more user profiles 24 to data center 14. Alternatively, in embodiments in which the first user stores the user profile questions on the first user's mobile device 12, then the mobile device 12 associated with the first or second user may determine whether the second user completed one or more user profiles 24. If data center 14 determines at step 322 that the second user chose not to register with system 10, the method may end. If data center 14 determines at step 322 that the second user chose to register with system 10, then at step 324, data center 14 may generate match data 26 for the second user. For example, data center 14 may compare the one or more user profiles 24 submitted by the second user as a part of the registration process to other user profiles 24, including the first user's one or more user profiles 24. As another example, the mobile device 12 associated with the first or the second user may compare the one or more user profiles 24 filled out by the second user, in embodiments in which the mobile device 12 associated with the first user communicated user profile questions to the second user for example. The method returns to step 312.

In certain embodiments, application 20 on the mobile device 12 of the second user may be associated with a network in infrastructure mode or a proprietor_name.net SSID in ad-hoc mode. If the second user clicks on the proprietor_name.net SSID, then the second user may be routed to a web page hosted by the first user's application 20. The web page may inform the second user of one or more capabilities of system 10 and may ask whether the second user would like to know what the second user shares in common with the first user. The first user may choose to have his picture and a tagline included on this web page. In certain embodiments, if there are multiple registered users nearby the second user, the second user may be taken to the web page of a user that is hosting the proprietor_name.net SSID. That web page may include its associated user's unique personal URL and any other suitable information, such as a list of personal URLs for other registered users who are nearby. This may allow the second user to click on any one of the URLs to view what the second user shares in common with each of those users. If the second user has not completed a section in user profile 24 that those users have completed (e.g., the Dating Section of user profile 24), then the second user may be prompted to complete that section to view any commonalities the second user may have with those users.

Alternatively, the second user may click on a summary link that shows the client ID of all nearby users. This summary link may route the second user to the web site associated with data center 14 (and possibly the proprietor of system 10), where the second user may complete the appropriate user profiles 24. The second user may then be notified of which other users share the most in common with the second user and any other suitable information. The second user may also download application 20 (or acquire application 20 from another user, as described above) to engage in messaging with the other users. In certain embodiments, the second user may "ping" the mobile devices 12 of other nearby users to prompt a synchronization event, so that the first user and any other registered users nearby may view what they share in common with the second user. Additionally or alternatively, the second user may click on the summary link to view what the second user shares in common with the users listed. This information may be aggregated or listed separately for each user, according to particular needs.

In certain embodiments, the second user may enter an identifier of another user (e.g., the first user) such as an email address, telephone number, name, username, instant-messaging screen name, or other suitable information for identifying the first user into the web site associated with data center 14 (and possibly the proprietor of system 10) to view what the second user shares in common with the first user. In certain embodiments, one or more plug-ins may be added to existing or newly developed applications (e.g., instant-messaging applications, email applications, telephone applications, or any other suitable applications). For example, if a first user sends a second user an email, instant message, or VoIP call, then the plug-in may display what the first and second users share in common. This capability may provide users with additional authentication mechanisms, as well as a way to avoid spammers. In certain embodiments, sales people may use this capability to facilitate sales initiated by emails or other forms of communication. For example, the email or other communication may increase the chances of a response by allowing the recipient to view what he shares in common with the sales person. Providing this rapport with a prospective client may increase the likelihood of making a sale. As another example, users who are single may use this capability to determine how much they share in common with a prospective mate.

In certain embodiments, match data 26 such as match IDs may include the user's personal URL who is identified as a match by the match data. This may allow users to perform a local lookup of a personal URL (e.g., without contacting data center 14) to determine whether they are matches with the user associated with the personal URL. For example, if a first user encounters a second user's personal URL, the first user may enter the second user's personal URL into the first user's mobile device 12, and application 20 or another suitable component of the first user's mobile device 12 may access match data 26 stored in memory module 22 of the first user's mobile device 12 to determine whether the first and second user's are a match.

The personal URL may provide an alternative form of "detection." For example, in certain embodiments, users may detect one another using a wireless technology such as Wi-Fi or BLUETOOTH. The URL may provide another form of detection—printed text. For example, the URL may be displayed in virtually any printed or otherwise visible form. People that are within "reading-range" of the URL may perform a look-up of that URL (e.g., via SMS, the Internet, or another suitable communication medium) to see what they share in common with the user associated with the URL. The user associated with a URL may distribute business cards, stickers, pictures, or other suitable objects that include the URL, which may allow the person to retain anonymity while still having the opportunity to view shared commonalities or other characteristics.

As a particular example, a first user may be John, and a second user may be Mary. Suppose John is interested in dating Mary but is too shy to approach her in person. John may place a card or note that includes his personal URL at a location where he is sure Mary will find it. Later, Mary "detects" John when she finds the card or note and performs a look up on what they share in common.

As described above with respect to tagged information, in certain embodiments, a user may submit one or more keywords that explicitly state characteristics for which the user is looking to find in a match. In certain embodiments, these active search lists could be applied to personal URL matching as well. For example, when a first user encounters a second user's personal URL on which some portion of the text of one or more web pages associated with the URL matches an active search keyword of the first user, one or more of the first and second users may be notified of the match.

In certain embodiments, a first user may have custom home pages or introduction message for different personal URLs, each associated with a particular group, profile, or other criteria for example, which may allow the text that is presented to a second user to be dependent on which groups or other criteria are shared between the first and second users. In certain embodiments, personal URLs may be based on a particular MAC address, as described in more detail below with reference to proximity determination. The personal URL may then be posted at locations near that particular MAC address.

In certain embodiments, a user may be able to specify an availability setting for the user's associated one or more personal URLs. The availability setting for a user's personal URL may allow the user to adjust how open or available the user is for matches that are based on the personal URL. In certain embodiments, a user may lower his availability by decreasing the user's availability setting if the user desires to decrease the number of matches of which he is notified based on someone's request via his URL. For example, a decrease in a first user's availability setting may require another person who visits the personal URL of the first user (e.g., by entering the URL into a browser) to have an increased amount in common with the first user before a match is detected and the other person is able to message or otherwise contact the first user. In certain embodiments, a user may increase his availability by increasing his availability setting if the user desires to increase the number of matches of which he is notified based on someone's request via his URL. For example, an increase in a first user's availability setting may require another person who visits the personal URL of the first user (e.g., by entering the URL into a browser) to have a decreased amount in common with the first user before a match is detected and the other person is able to message or otherwise contact the first user. It should be understood that the terms "increase" and "decrease" are used merely as examples. In certain embodiments, a user could increase his availability setting to become less available and decrease his availability setting to become more available.

In certain embodiments, if a second user is not allowed to contact the first user because there are not enough shared commonalities to result in a match that satisfies the availability setting for the first user, the second user's visit to the personal URL of the first user (the "encounter") may still be logged as an event. In this example, when the first user reviews his log to view who has visited his personal URL, the first user may be able to see that the second user was there and click to visit the personal URL of the second user. In such a scenario, the first user may allow the second user to contact the first user, permitting the second user to pass through the availability filter. In certain embodiments, due to the structure of the personal URL, both identities may have remained anonymous to the other.

Detection of a User of Another Mobile Device Through a Third Party

System 10 may be operable to notify two users that they are a match, even if they do not detect each other in proximity. In certain embodiments, this notification may be communicated due to detection of a third party. For example, assume that John's mobile device 12 detects Steve's mobile device 12 at a first time. Assume also that John's mobile device 12 detects Mary's mobile device 12 at a second time. If the second time is within a predefined time period from the first time, then it may be assumed that Steve and Mary are in proximity, and a notification may be communicated to Steve and Mary (e.g., if Steve and Mary are a match).

As a particular example, BLUETOOTH has a limited range of approximately twenty to thirty feet, so if John's mobile device 12 detects Steve's mobile device 12 and then John moves to another room or walks down the block and detects Mary's mobile device 12, information regarding those two detections may be sent to data center 14. Data center 14 may then determine that Steve and Mary are close enough to one another to be deemed "in proximity" given that John was in proximity to both of them within a few minutes (or any other suitable interval). Data center 14 may then communicate a notification to one or more of Steve, John, and Mary indicating that they are in proximity.

The notification may include a description of what Steven, John, and Mary share in common, an abstraction of their relevance to one another (e.g., "very relevant match"), a group affiliation (e.g., "another Cornell alumni is nearby"), a list of things they share in common, a description of what they are each looking for (e.g., "Steve wants to meet someone for a date on Friday night"), a link to their user profiles to browse online (e.g., Steve could receive a link to Mary's MATCH. COM profile), or any other suitable information.

Delayed Communication Between Matched Users

In certain embodiments, users of system 10 may communicate at a later time based on a previous match. For example, when a match occurs, the match may be logged even if the user does not wish to be notified in real time of the match.

Many users may not take action at the time of the encounter. This may be referred to as a missed encounter. In certain embodiments, the encounter may be logged with one or more of a time and date stamp, the client ID of the matched user, the personal URL of the matched user, and any other suitable information.

When a user later synchronizes the user's data with data center 14, the client ID of the matched user, personal URL of the matched user, date and time of the missed encounter, or other suitable information may be uploaded to data center 14. A user may access a list of his most recent matches online, via data center 14 for example. In certain embodiments, the user may have a window of opportunity (e.g., forty-eight hours) to communicate anonymously with a matched user, using an online messenger tool, email anonymizer, SMS, email, or another suitable mechanism. In certain embodiments, the location and time of the match is known only to the matched users. Thus, in such embodiments, that information may be used to authenticate the matched users at a meeting or other interaction.

The concept described in this section may be referred to as separating the encounter (i.e., the detection of a matched user in proximity) from the notification of the match in proximity. The notification of the encounter may be communicated in any suitable manner, according to particular needs. For example, the notification of the encounter may be delivered using SMS, email, IM, the application 20 functionality, a third-party website (e.g., MYSPACE.COM or MATCH.COM). With respect to the third-party website, for example, this encounter notification may be used as a proximity filter on the third-party website, such that only those people who have been in proximity to me are shown.

Using BLUETOOTH to Communicate with Mobile Devices 12 on which Application 20 has not been Installed In certain embodiments, a first user's mobile device 12 (e.g., mobile device 12a) may be BLUETOOTH-enabled and may broadcast the first user's personal URL or other suitable information using the BLUETOOTH device. The device name of mobile device 12a may be set as the first user's personal URL, which may allow other BLUETOOTH-enabled mobile devices 12 that are nearby to display the first user's device name (i.e., personal URL) without requiring application 20 to be installed on these other mobile devices 12. For example, assume a second user's mobile device 12 (e.g., mobile device 12b) does not include application 20 but is BLUETOOTH-enabled. When the mobile devices 12a and 12b are within BLUETOOTH range, mobile device 12b may display the first user's personal URL. The second user may type the personal URL into any suitable browser to visit the web site associated with data center 14 (and possibly the proprietor of system 10) and view what the first and second users share in common.

In certain embodiments, a first user John may type a second user Mary's personal URL into an SMS message and send it to an SMS number associated with data center 14, which may process the match for him and reply with a set of commonalities, if any. An SMS server associated with data center 14 may receive John's SMS message, and if John is already a registered user, data center 14 may identify John through his telephone number. Data center 14 may determine John's client ID, retrieve the match ID for John and Mary, and communicate an SMS message to one or more of John and Mary that includes information regarding what John and Mary share in common and/or any other suitable information. In certain embodiments, if John is not already a registered user, John may send an SMS message (i.e., that includes Mary's client ID) to an SMS number associated with data center 14.

If data center 14 does not recognize John as a registered user (e.g., does not recognize John's telephone number), data center 14 may communicate to John an SMS message requesting John's authentication information (e.g., username and password). After data center 14 receives John's authentication information, data center 14 may communicate the match results to John in an SMS message.

In certain embodiments, if John is not yet a registered user of system 10, then data center 14 may communicate user profile questions to John, and John can answer those questions through SMS, instant messaging, email, a VoIP call, a telephone call, a chat session, or any other suitable manner for data center 14 to receive that information and process it for matches. After data center 14 receives the answers, data center 14 may process the information to determine any suitable matches and may communicate the results to John. If John desires to contact Mary, John may do so in any suitable manner, including for example SMS, instant messaging, email, a VoIP call, a telephone call, a chat session, or any other suitable manner. In certain embodiments, if John chooses to send an SMS message, he may send a message that includes Mary's client ID to data center 14. Data center 14 may route John's message to Mary's cell phone or other suitable mobile device 12. Mary may respond to John in any suitable manner, according to particular needs. For example, Mary could respond using SMS, instant messaging, email, a VoIP call, a telephone call, a chat session, or any other suitable manner, which may be routed through data center 14 to John's mobile device 12. In certain embodiments, routing messages through data center 14 may allow both parties to remain substantially anonymous when communicating.

In certain embodiments, a first user's mobile device 12 (e.g., mobile device 12a) may be BLUETOOTH-enabled and may register the client MAC address (which may be unique) of its BLUETOOTH device to data center 14 (e.g., to the user account of the first user). The unique MAC address of mobile device 12a may be beaconed when the BLUETOOTH interface of mobile device 12a is active. When mobile device 12a within range of another mobile device 12 or other computing device that is BLUETOOTH-enabled and that has application 20, the MAC address of the other mobile device 12 or other computing device may be scanned and reported to data center 14. In certain embodiments, if any other relevant users of other mobile devices 12 (e.g., users who are matches for the first user) are also reported to data center 14 as being nearby (i.e., either via BLUETOOTH scan, Wi-Fi, GSM, or otherwise), then the first user may receive a notification from data center 14 via SMS, email, or another suitable type of communication.

Closed Group Matching

In certain embodiments, system 10 allows third parties to form closed or trusted groups, which may allow their members to be matched without requiring user input. For example, the system may pre-process a pool of client IDs, matching them solely based on affiliation with a group, and then transfer those client IDs to the organizer of the group to be distributed to the group members or to allow those group members to download the client IDs directly from data center 14. As a result, a member may be able to "see" all of the other members of the affiliation, as they have been pre-processed and pre-authenticated. In certain embodiments, system 10 allows a third party to broadcast a client ID for a particular affiliation. Example groups may include NYU alumni, MATCH.COM subscribers, or any other suitable groups, according to particular needs.

In certain embodiments, when a user accesses a web site associated with data center 14 (and possibly the proprietor of system 10) from a referring web site (i.e., a web site on which the user clicked a link to the web site associated with data center 14), an authentication may be performed based on the URL of the referring web site. For example, a user may access the web site associated with data center 14 to add or modify the user's profile 24. If the user was not referred from an approved web site, the user may be prevented from adding certain groups or affiliations to the user's profile 24. This authentication may allow a group to maintain responsibility for access to a given URL and simply provide that URL to data center 14. Thus, if a user cannot access the given URL, the user would not be able to list the group associated with the given URL in the user's profile 24. Rather than the group providing a list of members or other suitable information that may change on a regular basis, this authentication process may simplify controlled access to joining a group.

Implied Proximity

In certain embodiments, system 10 may allow distribution of pre-processed matches to members of a particular group at a particular location and/or time. The members of the group may be assumed to be close enough for some or all members of the group to detect one another (e.g., within walking distance), which may be referred to as implied proximity. For example, implied proximity may exist at a conference, a cocktail party, a speed-dating event, a coffee shop, an airport, a university, a wedding, or any other suitable gathering of users that is known or scheduled in advance. Conference organizers may use this feature during an opening session of a conference. Universities may use this feature as part of their orientation programs. A coffee shop may use this feature as a way to encourage more people to visit its locations.

Users at one of these locations or events may sign in at any suitable time, such as prior to or when they arrive at the location or event. Synchronization information may be distributed to the mobile devices 12 of the users at a predetermined time. For example, the users may be available for an "SMS bomb" at 7:00 PM. In particular, at the predetermined time, each user may receive notification of the presence of the members of the group most relevant to the user. These matched users may then be able to initiate communication with each other and locate each other at the event, if desired.

In certain embodiments, if a group desires to organize an event using implied proximity, the group can register the event at a web site associated with data center 14 and send an invite to potential attendees. Some group members may already be registered users. These members may select either an existing user profile 24 to use at the event or complete a new user profile 24 specific to the event. Group members who are not already registered users may register and complete one or more user profiles 24. The user profiles 24 of the group members may be matched at data center 14. At one or more specified times (e.g., on the day of the event), data center 14 may communicate messages using SMS or another suitable mechanism to the group members. These messages may indicate to each user the matches that the user has at the event. The messages may be communicated all at once or at various times throughout the event. For example, each user may receive one match every hour or at another suitable interval. As a particular example, a speed-dating event may use an SMS message containing a match to trigger a user to move to a new partner and use the contents of the match to initiate a discussion. This capability may automatically provide two attendees with something to talk about, and because there may not be enough time to discover certain relevant information regarding a potential date, this capability may allow two attendees to learn more about one another through their detailed user profiles 24. As another particular example, this capability may be used at a wedding to quickly introduce everyone at a particular table at the reception. The bride or groom may add introduction notes so that two users know that the bride or groom want them to meet.

In certain embodiments, match data 26 may be sent to some or all users who are members of a particular group at a particular time or location, when two group members come within proximity of each other at the event, when group members come within proximity of each other and another group member, or in any other suitable manner. For example, a conference schedule may include one or more breaks at which it might be appropriate for conference members to converse with one another. Match data 26 may be sent to users during these breaks to facilitate discussions between certain attendees. In certain embodiments, each user can configure the interval at which the user receives match data 26.

In certain embodiments, each message that a user receives containing match data 26 identifying a match may include instructions for replying to the message. If a user replies to the message, the message may be sent anonymously to the identified match using, for example, an SMS message routed through data center 14 or another suitable location. A user may be able to request new matches at any time. Additionally or alternatively, each user may be able to configure the interval at which the user receives match data 26. In certain embodiments, a user may review a personal SMS history to review the user's previous matches.

Certain group members (e.g., the organizers of the event) may send introduction messages that can be attached to the match data 26 sent to each user. A user may also receive reminder notes regarding the other users the user has met at the event. For example, these notes may have been created by the user. As another example, these notes may include notes created automatically by data center 14 because the two users met on a previous occasion using system 10.

In certain embodiments, a server or other computer system associated with data center 14 may be located at the particular location for the event. In such embodiments, match data 26 may be communicated to users using BLUETOOTH, Wi-Fi, or another appropriate communication mechanism.

In certain embodiments, an SMS notification or other suitable message may be sent to each user at a certain time to notify the user of all matches for the user that were at the same location or event, regardless of whether the matches were at the location or event at the same time as the user. For example, two users who missed each other at the event but are a match may be notified about the missed opportunity to meet or otherwise interact.

External Web Service

In certain embodiments, system 10 includes a web service 40 that may be coupled to network 16. Although a single web service 40 is illustrated and primarily described, the present invention contemplates any suitable number and types of web services according to particular needs. Web service 40 may be associated with the proprietor of system 10 or may be provided by a third party. In certain embodiments, web service 40 may use the pre-processed match data 26 determined by data center 14 to provide functionality to system 10.

In certain embodiments, personal URL matching as described above may be implemented as a web service 40 so that other entities may allow their web applications to use the match data 26 determined at data center 14. In such embodiments, web service 40 may provide match data 26 determined at data center 14 as XML content for use by an application associated with web service 40.

In a particular example, web service 40 is an online instant messaging service. Previous instant message services simply provide lists of users explicitly identified by a particular user (e.g., a "buddy" list) and may provide an indication of when the users in those lists are on the Internet. A web service 40 that uses match data 26, however, may attach "presence" to very complex information by attaching a user's personal URL to the user's presence information. The presence information may include the personal URL with an XML summary of an algorithm that has been pre-processed and is being served by web service 40. For example, instead of merely showing a user a buddy list and attaching status or location data as presence information, web service 40 may allow detection of more complex relationships with other users who are on the Internet, based not on a pre-defined buddy list, but on group affinities, goals, and any other suitable information. In other words, data center 14 may provide a pre-matching service for the users of web service 40 that is much more complex than simply a pre-defined buddy list. This information may be distributed, as appropriate, to end users of the web service 40, and may provide a rich set of "matching criteria" for the end users using a relatively narrow band of presence information. For example, by distilling match data into summarized presence information, web service 40 can display complex relationships using a minimal amount of presence information—a single personal URL.

Use of Match Data in Cooperation with Third Parties

The proprietor of system 10 may cooperate with one or more third parties, such as one or more online social networking sites/personals websites (e.g., MATCH.COM), to match members of the third-party sites. For example, the third-party website may provide their data to system 10 (e.g., to the proprietor of system 10), and that data may be used to match members of the third-party website who are in proximity. In certain embodiments, the third party websites may use application 20 to display those users in proximity to the members of their websites. Additionally or alternatively, data center 14 may determine those users who are in proximity and then notify those members of the third-party website about the detection of a match in proximity. The detected matches in proximity may be viewable to those members on the third-party website or in any other suitable manner. Additionally, those members may be able to view what they share in common with the detected match and to message the detected match.

Centralized Determination of Proximity Based on Network Identifier Scan

In certain embodiments, the present invention includes determining whether two mobile devices 12 are in proximity in a centralized manner. For example, data center 14 may be operable to determine whether two users are in proximity. This capability may provide an additional way for system 10 to detect two users in proximity. In a particular example, when a user logs into data center 14, data center 14 may determine which other users are on the same private subnet, using a server infrastructure of data center 14 for example, which may allow data center 14 to discover "users in proximity" without or independent of mobile devices 12 discovering one another on the local subnet (e.g., using UDP multicast techniques such as Rendezvous).

FIG. 4 illustrates an example method for centralized determination of proximity. At step 400, a mobile device 12 may scan for network address information of one or more networks within range of mobile device 12. For example, application 20 on mobile device 12 (possibly in cooperation with adaptor 18) may scan for network MAC addresses or other suitable addresses of all of the Wi-Fi access points within range of mobile device 12. Applications 20 may use one or more low-layer Wi-Fi drivers to perform this scanning. As described above, although Wi-Fi is primarily described, the present invention contemplates any suitable wireless platforms in any suitable combination, along with their associated network identifiers. Additionally, as described above, mobile devices 12 may be used as reference beacons in system 10 in a substantially similar manner to the manner in which network access points (e.g., MAC addresses and cell tower IDs) are used.

At step 402, mobile device 12 reports the network address information to data center 14. For example, application 20, possibly in cooperation with adaptor 18, on mobile device 12 may report the network address (e.g., MAC address or cell tower ID). In certain embodiments, mobile device 12 may perform one or more of steps 400 and 402 in response to a request from data center 14. In certain other embodiments, mobile device 12 may perform one or more of steps 400 and 402 automatically at one or more appropriate times. For example, mobile device 12 may perform one or more of steps 400 and 402 at predetermined intervals (e.g., approximately every five seconds). At step 404, data center 14 may receive the network address information reported by mobile device 12.

At step 406, data center may process the network address information received from mobile device 12. In certain embodiments, processing the network address information (e.g., one or more MAC addresses or one or more cell tower IDs) received from mobile device 12 involves comparing the network address information received from mobile device 12 to network address information received from one or more other mobile devices 12. For example, if two mobile devices 12 report having the same MAC address in range, then data center 14 may determine that these two devices are in proximity to one another. For example, a wireless network associated with a MAC address may have a particular range (e.g., approximately 300 feet). If two mobile devices 12 report being able to detect the MAC address for this wireless network, then data center 14 may determine that the mobile devices 12 are no more than approximately 600 feet from one another in this example. In certain embodiments, even if the two mobile devices 12 are not using the same network, the two mobile devices 12 could be notified of one another (e.g., by data center 14) and may be able to communicate with one another, via data center 14 for example. In this example, data center 14 effectively bridges networks that are located near one another, even if the two networks are on different IP subnets.

At step 408, data center 14 may report any appropriate information based on the processing performed at step 406. For example, data center 14 may notify the users of the two mobile devices 12 that they are in proximity to one another. As another example, data center 14 may report certain aggregate information regarding a network associated with a reported network address to one or more mobile devices 12 or other suitable recipients. This aggregated information may include, for example, characteristics of users reporting that network address.

In certain embodiments, the process of identifying users of mobile devices 12 based on the MAC or other suitable network address of the network access point may provide users on a switched WLAN with the ability to detect one another, even though local traffic on the subnet is segmented. Additionally, in environments in which the wireless infrastructure spans a relatively large area on a single subnet, the reported MAC or other suitable address may be for the closest access point, so the reported address may provide a way to isolate mobile devices 12 that are using the same access point, as opposed to those mobile devices 12 on the same subnet, which may or may not imply physical proximity of mobile devices 12. In certain embodiments, the network address reporting mechanism provides a more accurate representation of physical proximity and may operate in switched WLAN environments, virtual LAN (VLAN) environments, or any other suitable network environments.

In certain embodiments, application 20 on a first mobile device 12 may allow the first mobile device 12 to detect other mobile devices 12 on multiple networks around the first mobile device 12 by identifying a hardware signature (e.g., the MAC address or the cell tower ID) of the detectable wireless networks around the first mobile device 12, and then comparing the detected hardware signatures (e.g., MAC addresses or cell tower IDs) with detected signatures (e.g., MAC addresses or cell tower IDs) of other mobile devices 12. In certain embodiments, application 20 on the first mobile device 12 intermittently polls the one or more neighboring Wi-Fi access points and communicates the detected network address information (e.g., MAC address information or cell tower ID information) to data center 14 where it can be compared and reported to one or more mobile devices 12 (e.g., the first mobile device 12). This may allow the user of the first mobile device 12 to be aware of users of other mobile devices 12 who are nearby, even though no absolute location (e.g., latitude and longitude) are reported to data center 14.

In certain embodiments, determining the distance between mobile devices 12 may be made even more accurate by comparing the reported list of all networks address information (e.g., MAC address information or cell tower ID information) that a mobile device 12 can detect. For example, if two mobile devices 12 report the same set of MAC addresses, data center 14 may assume that the two mobile devices 12 are nearer to one another than a third mobile device 12 that only reports one of those MAC addresses.

In certain embodiments, the process of reporting network address information to data center 14 may be used to identify the digital signatures of cellular base stations or any other element of wireless or wireline network infrastructure by identifying the hardware or software signature (e.g., network address information) that the infrastructure element emits, and then reporting that signature to data center 14, comparing the signature with other received signatures, and reporting suitable information to the appropriate mobile devices 12.

In certain embodiments, centralized proximity detection may be performed for mobile devices 12 that are BLUETOOTH-enabled. Although mobile devices 12 that are BLUETOOTH-enabled are primarily described, other relatively short-range wireless communication protocols may also be used. Application 20 on a particular mobile device 12 may scan for the BLUETOOTH IDs of other mobile devices 12 that are nearby mobile device 12 and then report those BLUETOOTH IDs to data center 14 in any suitable manner (e.g., SMS, Internet communication, or in any other suitable manner). Data center 14 may use the reported BLUETOOTH IDs to determine which mobile devices 12 are nearby one another based on which BLUETOOTH IDs are reported by each mobile device 12. In certain embodiments, this capability may help extend the range of BLUETOOTH proximity-matching because a user of mobile device 12 may discover users of other BLUETOOTH-enabled mobile devices 12 that are not within the range of the user's own BLUETOOTH mobile device 12.

The range of BLUETOOTH mobile devices 12 may vary. In certain embodiments, a BLUETOOTH mobile device 12 with a longer range may act as a bridge for shorter-range BLUETOOTH mobile devices 12. The longer-range BLUETOOTH mobile device 12 may allow the shorter-range BLUETOOTH mobile devices 12 within range to be notified about the presence of one another, even if the shorter-range mobile devices 12 cannot detect each other on their own.

In certain embodiments, centralized proximity detection may be used in combination with a number of different protocols to help bridge different mobile devices 12. For example, a first user, Steve, may be associated with a first mobile device 12a that includes both Wi-Fi and BLUETOOTH communication capabilities. Application 20 on mobile device 12a may detect all of the hardware signatures around mobile device 12a (e.g., the hardware signatures of any nearby Wi-Fi networks possibly including the MAC addresses of those Wi-Fi networks, and the BLUETOOTH signatures possibly including the BLUETOOTH IDs of other mobile devices 12 within range of mobile device 12a). Mobile device 12a may report those hardware signatures to data center 14, which may compare the signatures to signatures reported by users of other mobile devices 12 to determine which users are in proximity to one another. This capability may allow data center 14 to detect users in proximity even if one of the users is using a Wi-Fi mobile device 12 and another is using a BLUETOOTH mobile device 12. Data center 14 may use this proximity information to notify users about the other matches nearby them.

For example, a first user John may be using a Wi-Fi-enabled laptop mobile device 12, and data center 14 may communicate matches to John's laptop for display to John. As another example, a second user Mary may be using a BLUETOOTH-enabled cellular telephone mobile device 12, and data center 14 may communicate an SMS message to Mary's cellular telephone regarding the matches nearby Mary. In certain embodiments, if John and Mary would like to communicate with one another to set up a meeting or other interaction, then they may communicate through data center 14. For example, a message that John sends from his laptop may be routed through data center 14 to Mary's cellular telephone. Data center 14 may send to Mary's cellular telephone an SMS or other suitable message, notifying her of John's message. John may respond with an SMS or another suitable message that may be routed to data center 14. Data center 14 may forward John's message in a suitable format to John's laptop. In certain embodiments, both John's laptop and Mary's cellular telephone include application 20. Alternatively, John's laptop includes application 20, and Mary's cellular telephone does not. As another alternative, neither John's laptop nor Mary's cellular telephone includes application 20. In such a scenario, data center 14 may notify each of John and Mary about the other's presence, which data center 14 may have learned from a third party who observed one or both of John and Mary nearby or from any other suitable source.

This type of relative proximity determination (i.e., determining that one mobile device 12 is in proximity of another mobile device 12) is readily distinguishable from other potential solutions, which may perform triangulation to determine user location, use global position system (GPS) data to determine user location, or may assign a latitude and longitude to network access points to determine user location. While those solutions may require knowledge of the exact coordinates (e.g., latitude and longitude) of each network access point), the ability of certain embodiments of the present invention to determine when users are "nearby" or otherwise in proximity of one another may be more dynamic, adjusting to changes in the network infrastructure (e.g., moving of a network access point) without requiring knowledge of the new location (e.g., latitude and longitude) of the network access point.

In certain embodiments in which data center 14 receives network address information (e.g., MAC addresses or cell tower ID) of access points, certain additional features may be used. For example, each network address may be treated as an entity. Data center 14 may gather statistics for the entity and report to users of mobile devices 12 what they share in common with other users at this MAC address (e.g., the aggregates of certain types of users who have also reported that MAC address or cell tower ID). For example, this information could be used to determine the most compatible coffee shop for a user to frequent, which location on a university campus a user is most likely to meet like-minded people, or for any other suitable purpose. As another example, by detecting which users are currently near a particular MAC address (or other network identifier), data center 14 may provide a web page for each MAC address that displays which users are currently near that MAC address and may provide the personal URLs for those users. Using the personal URLs, even individuals who have not installed application 20 on their mobile devices 12 may see which other users are at the location associated with the MAC address.

FIG. 5 illustrates an example set 500 of networks 502 that may be used for centralized proximity detection according to certain embodiments of the present invention. Networks 502 may include any suitable types of networks, according to particular needs. Each network 502 may be associated with a network identifier (e.g., MAC address or cell tower ID) that may be detected by mobile devices 12 within range of a wireless access point of that network 502. Three example users are illustrated as users 504, 506, and 508.

In the illustrated example, a user shown within the circumference of a circle representing a network is able to detect the presence of that network (e.g., the MAC address or cell tower ID) of the wireless access point of that network) and may use that network. It should be noted that some networks 502 may require a subscription for a user to use that network. In certain embodiments, users may be able to detect network identifiers (e.g., MAC addresses) of networks even if those users are not subscribers of that network. For purposes of this example, it is assumed that all users have appropriate subscriptions to use any of networks 502. Also, for purposes of this example, it is assumed that each network access point is located at approximately the center of its associated network 502 and has a range of approximately 300 feet in all directions.

In the illustrated example, user 504 may only detect and use network 502c, user 506 may detect and use either of networks 502b and 502c, and user 508 may detect and use either of networks 502b and 502e. Suppose user 504 and user 506 have been predetermined to be matches for each other by data center 14. Suppose also that user 504 is using network 502c, and user 506 is using network 502b. In certain embodiments, user 504 may report the MAC addresses of network 502c to data center 14, and user 506 may report the MAC addresses of both networks 502b and 502c to data center 14 (even though user 506 is currently using network 502b). Data center 14 may process the MAC addresses reported by users 504 and 506 and, in response, determine that because both users reported the MAC address for network 502c, these users are in proximity. Data center 14 may notify the two users that they are a match.

Although the concept of centralized proximity determination based on network identifiers such as network address information has been primarily described in the context of matching users, it should be understood that the concept of centralized proximity determination based on network identifiers may be used in any suitable context, according to particular needs.

Moreover, although the concept of proximity determination has been described primarily with respect to network identifiers such as network address information, it should be understood that in addition to or as an alternative to network address information, data center 14 may receive information identifying mobile devices 12 that may be used to determine proximity. For example, mobile devices 12 may be considered reference beacons in the wireless infrastructure of system 10. Mobile devices 12 may beacon data that can be used to identify them. For purposes of this description, this data may be referred to as a network identifier, and the "network" associated with the network identifier may be a range around the mobile device 12. For example, if the mobile device 12 is BLUETOOTH-enabled, the network associated with the mobile device 12 may comprise the range of the BLUETOOTH device. Data center 14 may receive network identifiers that comprise data identifying mobile devices 12. This data may be used to perform proximity determination. For example, suppose a first mobile device 12a (e.g., a BLUETOOTH phone) beacons data identifying itself that is received by data center 14. If a second mobile device 12b and a third mobile device 12c are both determined to be in proximity of mobile device 12a, then it may be assumed that mobile devices 12b and 12c are in proximity to one another.

Multi-Hop Centralized Network Identifier Comparison

In certain embodiments, the ability of data center 14 to collect network identifier information, such as network address information, from mobile devices 12 may be used to detect other mobile devices 12 that are not within a particular range (e.g., radio range) of one another. Data center 14 may compare reported access points and execute a "friend-of-a-friend" algorithm for the MAC addresses or other suitable network address identifiers (e.g., cell tower IDs). For example, if a first mobile device 12a reports access points A and B and a second mobile device 12 reports access points B and C, then data center 14 may infer that access point C is one hop out of range for the first mobile device 12. Data center 14 may present the second mobile device 12 as a nearby user for the first mobile device 12 even though the second mobile device 12 is not detectable to the first mobile device 12. Additionally, a user may be able to select how far away the user wants to be able to detect other users by adjusting how many hops away are acceptable. This capability may provide an additional way for system 10 to detect two users in proximity.

Returning to FIG. 5, suppose again that user 504 may only detect and use network 502c, user 506 may detect and use either of networks 502b and 502c, and user 508 may detect and use either of networks 502b and 502e. Suppose further that user 504 and user 508 have been predetermined to be matches for each other by data center 14. Suppose also that user 504 is using network 502c, user 506 is using network 502b, and user 508 is using network 502e. In certain embodiments, user 504 may report the MAC addresses of network 502c to data center 14, user 506 may report the MAC addresses of both networks 502b and 502c to data center 14 (even though user 506 is currently using network 502b), and user 508 may report the MAC address of both networks 502b and 502e to data center 14 (even though user 508 is currently using network 502e). Data center 14 may process the MAC addresses reported by users 504, 506, and 508. Data center 14 may determine that users 504 and 506 are in proximity by a single hop because they both reported the MAC address for network 502c. Data center 14 may determine that users 506 and 508 are in proximity by a single hop because both users reported the MAC address for network 502b. Data center 14 may determine that users 504 and 508 are in proximity by two hops because both users reported a MAC address that user 506 also reported. In this example, assuming that matches two hops away are acceptable to both users 504 and 510, data center 14 may notify the two users that they are a match.

In certain embodiments, data center 14 may store the determined relationships between network access points, in database 32 for example. For example, data center 14 may store the determined relationships between network access points in a tree structure, which may provide a way to sort the network address identifiers (e.g., MAC addresses) based on hops. The tree structure may include data as reported by the users of mobile devices 12. For example, the tree structure may cluster network identifiers (e.g., MAC addresses) together that have been reported by users to be in range of each other. Single-hop MAC addresses that have been reported by many users to be nearby one another (those users that are within radio range) may be stored on the same branch. In certain embodiments, an entire tree structure based on one hops, two hops, three hops, or more may be determined based on a statistical sampling of users of mobile devices 12. As network devices (e.g., wireless access points) are brought into and out of commission, the networks associated with those network devices may be added and deleted from the tree based on this statistical sampling.

In certain embodiments, two or more network access points (e.g., wireless access points) may be "bridged" using their respective network identifiers (e.g., MAC address of each network's access point). Each network identified by the two or more network access points may be at locations that are not physically in proximity to one another, but that may share some other commonality on which basis some users may want these networks to be considered in proximity. As an example, a conference may be occurring in several buildings at distributed locations, and the attendees of the conference may wish to be considered in proximity of one another. As another example, a chain of coffee shops may wish to have its customers be considered in proximity, regardless of whether those users are at the same physical location.

Bridging may be applied regardless of the wireless protocol being used by mobile devices 12. For example, suppose mobile devices 12a has three network interfaces (e.g., Wi-Fi, WiMax, and GSM) available and currently detects four Wi-Fi MAC addresses, two WiMax base stations, and two GSM cell tower IDs. This information may be included in the proximity tree as being related or otherwise nearby one another. Continuing with this example, suppose mobile device 12b only has a GSM interface and currently detects one of the two GSM cell tower IDs that is being detected by mobile device 12a. In this example, mobile device 12b may be able to detect other mobile devices 12 that are also on the other WiMax and Wi-Fi networks detected by mobile device 12a, even though mobile device 12b lacks a Wi-Fi or WiMax interface.

In certain embodiments, by grouping or clustering the network identifiers (e.g., MAC addresses) in data center 14, physical locations may be bridged together. This grouping may be performed in response to a user request, in response to a request from the proprietor of a business (who may or may not be a "user" of system 10), or in any other suitable manner, according to particular needs. In certain embodiments, each of the network identifiers (e.g., MAC addresses) of the two or more networks may be associated with a tag or keyword, which may be presented to other users. As an example, different rooms of a conference or different buildings of a conference may each have a keyword assigned to the network identifier of their respective network(s) (e.g., the MAC address of each wireless access point), so that a first user "John" might be listed in "meeting area A" in application 20, and a second user "Mary" may be listed in "Simulcast Lounge B" based on the network identifiers that John and Mary reported to data center 14 (e.g., using application 20). This grouping or clustering of network identifiers may be considered an example in which proximity includes a predefined relationship of the networks corresponding to the one or more network identifiers received from the first mobile device and the one or more network identifiers received from the second mobile device.

Although the concept of multi-hop centralized MAC address comparison based on network identifiers such as network address information has been primarily described in the context of matching users, it should be understood that the concept of multi-hop MAC address comparison based on network identifiers may be used in any suitable context, according to particular needs.

Time-Shifted Match Notification Based on Mac Address Comparison

In certain embodiments, MAC address information (or other suitable network identification information) communicated by mobile devices 12 to data center 14 may be associated with a time stamp, which may identify when a user arrives at or leaves a particular location. For example, mobile device 12 may attach the time stamp to the MAC address prior to reporting the MAC address to data center 14. Alternatively, data center 14 may attach a time stamp to the MAC address reported by mobile device 12 upon receiving the MAC address from mobile device 12. Using the time stamp information, data center 14 may be able to determine not only who is at the location at the particular time the MAC address information is reported to data center 14, but also who was previously at the location and what commonalities were shared with those previous users.

In certain embodiments, data center 14 and the application 20 on mobile devices 12 cooperate to provide a centralized messenger that users may use when on line. This may allow users to be notified when other users are online. This capability, combined with the MAC address time stamp reporting capability, may allow users who were nearby one another at some point in time or who visited a particular location but at different times to contact one another online.

For example, assume John was in a coffee shop in the morning and signed onto data center 14 from the coffee shop. When John logged in, John's mobile device 12 may have reported the MAC address of the wireless access point at or near the coffee shop to data center 14, and suitable time stamp information may have been associated with the MAC address for John (e.g., both when John logged onto the network and off of the network). Data center 14 may compare the information reported for John with information for other users who reported that MAC address at the same or different times. Suppose Mary visits the coffee shop in the afternoon and signs onto data center 14, reporting the same MAC address of the wireless access point at or near the coffee shop, and suitable time stamp information was associated with the MAC address for Mary (e.g., both when Mary logged onto the network and off of the network). Mary may then query data center 14 to see what other users were in the coffee shop previously that she knows or with whom she shares something in common. Assuming John and Mary share something in common that would cause data center 14 to consider them a match, Mary may see John in the results of his query, possibly with an indication of when he was in the coffee shop. Suppose further that John is currently online, logged onto data center 14 from his office. In certain embodiments, even though John is not currently in proximity to Mary, he may show up as "available" to Mary because he was in the same proximity as Mary's current location at an earlier time, based on the MAC address comparison, and he now falls within Mary's time filter. Mary may be able to initiate communication with John online. In certain embodiments, even if John was not currently logged onto data center 14, Mary may be able to see what she shares in common with John, although she may not be able to set up current online communication with him. In this scenario, Mary may be able to send a message to John that he can receive the next time he is online or that message could be routed through data center 14 to reach John through another mechanism, such as SMS.

In certain embodiments, a user can search for other users who were at the same location as the user, when the other users were there, and whether they share anything in common with the user. This capability may be provided by any suitable combination of data center 14, application 20, web service 40, or any other suitable component of system 10. In certain embodiments, users may search for aggregated data on commonalities with specific MAC addresses or device signatures, locations, or latitude and longitude. For example, a user may be able to determine, or at least estimate, how many matches would be generated if the user were to frequent a particular location. This data may be used to infer how well a user may fit into the environment associated with a particular location. Specific examples may include determining which coffee shop to frequent, which apartment to rent, which college to attend, and which place to work. The data may also be used to determine other places those users share in common or frequent.

In certain embodiments, users may leave messages for one another (or for themselves) based on MAC address or other suitable network identification information. For example, a first user may leave a message for a second user based on a particular MAC address, or combination of MAC addresses, and the second user may receive the message when the second user reports the appropriate MAC address or combination of MAC addresses (e.g., when the mobile device 12 associated with the second user performs a network scan and reports that information to data center 14). As a particular example, a first user may leave a message in a particular coffee shop for a second user. The first user may compose the message and upload the message to data center 14. The message may be stored at data center 14 (in database 32 for example), along with other appropriate information such as the client ID of the second user, a MAC address associated with the coffee shop, a time and date stamp, or any other suitable information according to particular needs. In this example, when the second user arrives at the location and uploads the results (e.g., MAC addresses) of her network scan (e.g., an SSID scan), messages stored for the second user associated with one or more of the reported MAC addresses may be communicated to the second user.

Heterogeneous Connection Matching

In certain embodiments, a combination of peer-to-peer and centralized communication systems may be used. Instead of pre-synchronizing all matches to mobile device 12, only match IDs for users detected in proximity may be downloaded from a data center 14 to the device 1. As a result, storage space (e.g., memory module 22) on mobile device 12 may be saved. System 10 may use proximity-based matching by leveraging a Wi-Fi connection, BLUETOOTH device, or other local communication module on mobile devices 12 to detect another user in proximity, and then employing a cellular connection such as general packet radio service (GPRS), CDMA, or SMS to download from data center 14 the individual match IDs for those users that are detected in proximity.

Various combinations of detecting using a local protocol such as Wi-Fi or BLUETOOTH might be used, while maintaining a separate connection for Internet connectivity back to data center 14 (e.g., using WAN protocols such as GPRS, EVDO, EDGE, or other suitable protocols). As an example, a user may detect other users in proximity using a BLUETOOTH device, but then perform a lookup of the detected user in proximity using GPRS to determine whether the detected user in proximity is a match. In certain embodiments, SMS may be considered an "online" connection. In certain embodiments, heterogeneous connection matching may provide certain advantages. Suppose, for example, that a user is in proximity of six network access points, but each network access point has wired equivalent privacy (WEP) encryption enabled. This may prevent the user from gaining Internet access via these six network access points. The user may be able to access the Internet using a GPRS connection and report the MAC addresses of the six WEP-enabled network access points, even though the cannot associate with them. In certain embodiments, the user may then determine other users who are in proximity, even though the user has not connected to the Internet via a Wi-Fi connection.

Predictive Data Caching

In certain embodiments, data that is cached and/or synchronized to a mobile device 12 may be optimized based on the behavior of the user associated with the mobile device 12. For example, application 20 of a particular mobile device 12 may be able to synchronize or cache the match data that the user of the particular mobile device 12 is most likely to encounter, based on the network identifiers (e.g., MAC addresses) that the user reports to data center 14. Data center 14 may communicate to the particular mobile device 12 match data for users that have also reported the same network identifiers within a certain time period. For example, a first user may synchronize match data for all users that have reported any network identifier that the first user has "seen" (e.g., as part of a network scan) within the last seven days. These users may be the most likely users that the first user would see using system 10, and therefore these users may be the users that are stored locally on the particular mobile device 12 of the first user. Suppose in this example that the first user later takes an international trip to Japan (or otherwise frequents other locations). In certain embodiments, as the user begins to move around Tokyo, for example, the particular mobile device 12 of the first user synchronizes or caches match data for users that have reported the network identifiers that the first users encounters in Tokyo. The capabilities may facilitate data center 14 optimizing match data (or other data) for an individual user based on geographic behavior.

In certain embodiments, data center 14 may communicate to mobile devices 12 optimized and/or predictive match data based on behavior of application 20. For example, if a user spends most of his time with the match filter set to view only people from a certain group (e.g., NYU alumni), then the people in the NYU alumni group may be cached on the user's mobile device 12, and other users the user encounters may be queried from data center 14, using an online connection to data center 14 for example. While these techniques for predictive data caching based on a user's behavior have been primarily described, the present invention contemplates performing predictive data caching in any suitable manner, according to particular needs. For example, synchronization or caching of match data may be optimized based on a particular availability level, a particular active search keyword, a particular group or affinity, an explicitly stated geographic region (e.g., a user-identified zip code or metro-area), or any other suitable information according to particular needs.

Tracking Usage Information Based on User Behavior

As described above, in certain embodiments, data center 14 is operable to receive usage information from mobile devices 12. Data center 14 may receive this usage information and store it in association with the appropriate one or more user profiles 24 in database 32. In certain embodiments, usage information may be tracked based on the behavior of users of mobile devices 12.

As an example, if a first user of a mobile device 12 detects in proximity a second user of a mobile device 12 and if the mobile device 12 of the first user determines that the first and second users are a match, then the mobile device 12 may display certain commonalities or other attributes to the first user that reveal the basis of the match and other information about the second user. In certain embodiments, mobile device 12 of the first user may display the match bases (e.g., each commonality or other attribute that reveal the basis of the match and other information about the second user) to the first user as a link, system 10 may track which match bases are the basis for initiating a meeting or other interaction between the matched first and second users. For example, when the first user selects one of the match bases, the first mobile device 12 may initiate a chat session with the matched second user and record which match basis was selected by the first user to initiate chat session with the second user. The second user may be informed as to which criteria was selected by the first user to initiate the chat session. In certain embodiments, the recorded information (i.e., the match basis that was selected to initiate the chat session) may be synchronized to data center 14. Data center 14 may receive this usage information and store it in association with the appropriate one or more user profiles 24 in database 32. Storing this information may allow an operator of system 10 or a suitable application to determine which profiles are the most popular, which match bases are the most popular, which locations server particular functions (e.g., by recording network identifiers with the recorded usage information), and other suitable statistics.

In certain embodiments, a substantially similar approach may be used to gather usage information based on the personal URL. For example, each match basis displayed on a web page linked by a first user's personal URL may be is a link that allows a second user who enters the first user's personal URL to establish contact with the first user based on the match basis that is selected. In certain embodiments, the subject field of a contact message from the second user to the first user may be pre-populated with the match basis that was selected by the second user.

Automatic Recordation of Tag Information Based on Usage Information

As described above, in certain embodiments, data center 14 is operable to receive usage information from mobile device 12, both manually from a user of mobile device 12 and automatically based on the behavior of the user of mobile device 12. Moreover, as described above with reference to tagged information, a first user may tag "notes" to a second user to be displayed to the first user when the second user is detected in proximity and a match is determined. For example, this tag information to be displayed to the first user may include information regarding a past encounter with the second user.

In certain embodiments, system 10 can automatically insert data into these notes. This inserted data may include information about an encounter between two users after the encounter happens, so that the next time the two users encounter one another, each can be reminded about where and in what context they met. In certain embodiments, when meeting or other interaction (e.g., messaging) occurs between a first user and a second user after a detected match between the first and second users, the meeting or other interaction may be automatically recorded in a reminder note for both users, along with data such as a time and date stamp, the SSID name of the appropriate network (e.g., the network on which the match leading to the messages was detected), the location tags of the location associated with the network (e.g., "CES-ConferenceRoom4," "MainStreetCafe," "DFWAirport-Terminal3," or another suitable tag), and a reason for the previous meeting or other interaction (e.g., according to the usage information tracked based on user behavior), or any other suitable information.

Typically, SSIDs provide "human readable" versions of MAC addresses or other network identifiers. In certain embodiments, SSIDs may allow a user of a mobile device 12 to self-report his location by "checking in" to one of the SSIDs or location tags, which represent one or more network identifiers (e.g., a collection of MAC addresses and cell tower IDs that are associated with the location).

Collection of Data at Data Center 14

As should be apparent from the above description, in certain embodiments, data center 14 may collect and store information regarding users of mobile devices 12, networks detected by users of mobile devices 12 (e.g., including information regarding the wireless infrastructure, information regarding which users encounter which components of the wireless infrastructure, and other suitable information), encounters between users of mobile devices 12, and other suitable information. For example, data center 14 may collect and store information regarding each network 502. In certain embodiments, information regarding networks 502 is automatically communicated to data center 14 from one or more of mobile devices 12, network wireless access points, network hubs, and other suitable components of system 10. The following describes certain non-exclusive examples of the types of data that may be collected and the uses that may be made of the collected data.

Data center 14 may collect and store content generated by users of mobile devices 12. For example, data center 14 may associate the URLs of a user's web log, photos, podcasts, personal advertisements, classified advertisements, advertisements, and other suitable content to the MAC addresses and cell tower IDs that the user encounters. As described above, a user may also be able to leave messages for himself (or for other users of other mobile devices 12) based on particular MAC addresses.

Data center 14 may collect and store personality attributes and group attributes of the users who encounter certain networks over time. For example, data center may collect and store the personality attributes and group attributes of the users who pass by a particular wireless access point, and may assign those attributes to that wireless access point (e.g., MAC address or cell tower ID). This may assist data center 14 (or an operator of data center 14) in developing attributes for the wireless access point, such that the wireless access point acquires the aggregate attributes of those users who pass by the wireless access point. Additionally, assigning this attribute information to particular wireless access points may enable data center 14 or another suitable component of system 10 to direct users of mobile devices 12 to specific locations based on the wireless access points associated with those locations. In certain embodiments, a user of a mobile device 12 may be matched to particular wireless access points based on the attributes of the user's profile and the information assigned to the wireless access point.

In certain embodiments, advertisements, personal advertisements, and classified advertisements may be served on a per wireless access point basis (e.g., a per MAC address basis or per cell tower ID basis). The advertisements assigned to a wireless access point may be displayed on mobile devices 12 using application 20, on a web site associated with the proprietor of system 10, on a third party web page (e.g., a Wi-Fi hotspot landing page, cell carrier portal page, or any other webpage), or in any other suitable manner. The information gathered for each wireless access point (e.g., attribute information of users who pass by the wireless access point) may enable advertisers to advertise on specific wireless access points (e.g., MAC addresses or cell tower IDs) that have the demographics or the usage that the advertiser is targeting for its ads or other offers. In certain embodiments, the advertisements may be served on nearby networks as well, which may be referred to as multi-hop/zone ads. This capability may be facilitated by the concepts described above in the sections entitled Centralized Determination of Proximity based on Network Identifier Scan and Multi-hop Centralized Network Identifier Comparison, which may facilitate determining which networks are nearby the network to which an advertisement is assigned (e.g., based on implied proximity). Data center 14 or another suitable component of system 10 may create a feedback loop similar to a cookie, which may be used to attach a user's preferences, purchasing patterns, destinations, and other personalized information to suitable wireless access points (e.g., MAC addresses or cell tower IDs).

In certain embodiments, as described above, the present invention may provide time-shifted notification based on MAC address information (or other suitable network identification information), such that users of mobile devices 12 who visit the same locations but at different times may be notified that they are a match. Additionally or alternatively to this "missed connection" capability, in certain embodiments, the present invention may be operable to predict future connections. For example, data center 14 or another suitable component of system 10 may analyze use of system 10 (e.g., that dates and times that particular network identifiers are reported by users) to predict usage patterns, as well as receive self-reported itineraries from users of mobile devices 12. The purpose of this predictive analysis may be to predict when two or more users of mobile devices 12 may be at the same location or otherwise nearby one another. This may allow data center 14 to notify the users that one or more matches may be at the same location at some estimated time in the future.

In certain embodiments, a user of a mobile device may be able to share his "location" with other users. For example, the user may be able to share the wireless access points (e.g., MAC addresses, cell tower IDs, or other network identifiers) his mobile device 12 can detect with other users. The user may be able to limit the sharing of this information to other users who are in his trusted network. This information may be communicated from the user's mobile device 12 directly to other mobile devices 12, or the information may be delivered from data center 14.

Application Program Interface (API)

In certain embodiments, the present invention includes an API, which could be exposed on mobile devices 12, data center 14, or any other suitable component. In certain embodiments, an API exposed on mobile devices 12 may expose data downloaded to mobile devices 12 to other applications, such as instant messengers, APPLE ITUNES, or any other suitable applications according to particular needs. In certain embodiments, an API exposed on data center 14 may expose the pre-processed match data 26 to other applications, such as web services 40.

Particular embodiments of the present invention may provide one or more technical advantages. In certain embodiments, the present invention allows users with one or more shared commonalities or other reasons for interacting to detect each other in proximity. In certain embodiments, the present invention may match and connect people in physical proximity, based on their relevance to one another, their relative locations, and/or any other suitable parameters. For example, the present invention may connect users to other users in proximity who are relevant to one another a predetermined distance, such as within walking distance. As another example, the present invention may connect users to other users in proximity who share common affiliations and are a predetermined distance, such as within walking distance. In certain embodiments, the present invention may connect people who share things in common and are both online. In certain embodiments, the present invention enables users to quickly meet face-to-face to determine whether there is enough trust and interest to pursue a business personal, or other relationship. Moreover, in certain embodiments, the present invention may use one or more techniques to help secure the personal information of its users. Furthermore, in certain embodiments, the present invention allows users to be matched for any variety of reasons, regardless of whether the users share something in common.

In certain embodiments, the present invention connects users who share things in common even if one or more of those users do not already have an application for use with the present invention installed on their associated one or more mobile devices 12. In certain embodiments, the present invention connects users who share things in common and occupy or have occupied the same location (e.g., within a predetermined proximity range), even if at different times. In certain embodiments, the present invention creates an emergency relay messaging system for purposes of personal, local, or regional communication, which may be used when other communications infrastructure is unavailable for example.

In certain embodiments, the present invention may connect users based on any desire, relation, affiliation, or other reason. For example, the present invention may connect users within proximity for one or more of the following reasons: (1) facilitation of a business transaction, such as the buying or selling of goods or services; (2) business networking; (3) social networking; (4) dating; (5) reconnecting with friends and acquaintances; (6) establishing new friendships and acquaintances in a new environment (e.g., at a university, corporation, or other organization); (7) employment opportunities (i.e., both for the employer and potential employees); (8) connecting new employees to existing employees around them for purposes of faster integration (e.g., with new hires) and return on investment (e.g., with merger and acquisition or joint venture opportunities); (9) locating and meeting a roommate; (10) finding a doctor or other professional service; (11) connecting with distant relatives via genealogy information; (12) team building; and (13) any other suitable purpose, according to particular needs.

The present invention may provide various advantages by meeting the distinct needs of various users, which may vary with time. For example, the present invention may be tailored to individual networking goals of various users. Each user may have different networking goals, and the present invention may address any business or social networking need by recommending one or more matches to help the user to achieve the user's goals. For example, a user may enter networking goals into the user's profiles 24, and that profile information may be used, along with other suitable user profile information, to find a match who may help achieve the user's goals. Example goals include generating more referrals, closing more deals, signing up more clients, finding a date, and finding someone with different skills or interests to provide the user with a broader perspective or a different way of looking at things.

Some users may desire substantial privacy. In certain embodiments, the present invention allows a user to remain substantially or completely anonymous (either from the perspective of data center 14, other users, or both), and prevents certain information (e.g., personal information) from being viewed, transmitted, or tracked, according to a user's preference settings. For example, a user may configure whether or not to make the user's profile 24 viewable by other users. In certain embodiments, user profiles 24 are not transmitted wirelessly, while in other embodiments, a user profile 24 may be transmitted wirelessly. Communication with other users may be anonymous until the users meet or otherwise interact. In certain embodiments, locations visited by a user are tracked (e.g., based on network identifiers or other information reported by a user), while in other embodiments, such locations are not tracked.

Providing users with these and possibly other privacy options may encourage users to enter sufficient personal information to allow meaningful matches to be determined. Whereas previous online dating sites typically offer viewable user profiles, often limiting the amount and quality of information a user is willing to list in the user's profile, user profiles 24 in certain embodiments of the present invention may be protected.

In certain embodiments, because matches are pre-processed at data center 14, the user profiles 24 need not be sent wirelessly to other mobile devices 12 to determine a match, which may reduce or eliminate the risk that a third party could intercept the user profile 24 and compromise a user's privacy. This functionality may provide advantages over purely decentralized systems in which match user profiles are stored on users' mobile devices. In certain embodiments, after a match is determined and two users decide to communicate with one another, communication between the two users may still be anonymous. This may be desirable because one of the users could decide after a few minutes of messaging with the other user not to meet the other user in person. Thus, users may not feel obligated to meet face-to-face.

Because in certain embodiments system 10 detects matched users based on their proximity to one another rather than using triangulation or GPS data, data center 14 may not know the user's exact location and the location may not be tracked. Given the level of personal data some users may enter into their user profiles 24, many users may not desire a third party (e.g., a proprietor of data center 14) to know the users' locations at all times. If desired, however, triangulation, GPS data, or other location-determining technology may be used for matching.

A user may be busy at a particular time; thus, in certain embodiments, the present invention allows a user to specify availability settings, and may also allow relevance values to be determined for matches. Dynamic user control of availability settings allows a user to filter out all but the most relevant matches, when the user is busy for example. During the day, contexts and environments may change, and the user may be either more or less open to being matched with someone else based on these changed circumstances. For example, a user may be relatively open to matches at a conference, on an airplane, or at a bar. As another example, a user may wish to restrict matches to only those that are the most relevant when the user is working.

Certain users may demand or prefer trust when interacting with other users. In certain embodiments, the present invention allows users to meet face-to-face rather than online, which may facilitate trust. Whereas online matching may be completely devoid of trust, in certain embodiments, the present invention may match users within a relatively close range (e.g., 300 feet for certain Wi-Fi networks) where the users can meet face-to-face to assess and exhibit the trust necessary to form a new relationship. This process may be more efficient, allowing users to quickly meet face-to-face to determine whether enough trust exists to work together, date, engage in a business transaction, or otherwise interact. Moreover, this approach may allow users to better exhibit their charisma, credibility, integrity, knowledge, communication skills, or other suitable traits in a face-to-face meeting.

Certain users may travel frequently and may desire a solution that can operate substantially anywhere a user may travel. In certain embodiments, the present invention may function substantially anywhere in the world, including for example airports, airplanes, hotels, trains, cafes, parks, or other suitable locations.

Certain users may wish to minimize the number of devices that they must carry. In certain embodiments, the present invention works with Wi-Fi devices, for example, which may facilitate integration with a variety of mobile devices 12 that a user may already be carrying or may plan to carry.

A user may desire to manage relationships, not just manage contacts. In certain embodiments, the present invention may provide timely reminders about acquaintances who are nearby. For example, a user may be reminded of the names of contacts who are nearby, along with other useful information that the user had previously entered to be reminded about when encountering the contacts. This may lead to more effective networking.

Although particular methods have been described with reference to FIG. 2-4, the present invention contemplates any suitable methods for in accordance with the present invention. Thus, certain of the steps described with reference to FIG. 2-4 may take place substantially simultaneously and/or in different orders than as shown and described. Moreover, components of system 10 may use methods with additional steps, fewer steps, and/or different steps, so long as the methods remain appropriate.

Although the present invention has been described in several embodiments, diverse changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A method comprising:
receiving one or more network identifiers, each associated with a corresponding network, from a first mobile device;
receiving one or more network identifiers, each associated with a corresponding network, from a second mobile device;
processing the network identifiers received from the first and second mobile devices to determine whether the first mobile device and the second mobile device are in proximity to one another one another;
receiving a network identifier from a third mobile device;
comparing the network identifier received from the third mobile device to the one or more network identifiers received from the first and second mobile devices; and
determining that the first and third mobile devices are in proximity to one another when it is determined that:
at least one of the one or more network identifiers received from the first mobile device matches at least one of the one or more network identifiers received from the second mobile device; and at least one of the one or more network identifiers received from the second mobile device matches the network identifier received from the third mobile device, the at least one of the one or more network identifiers received from the first mobile device that is determined to match the at least one of the one or more network identifiers received from the second mobile device being different than the at least one of the one or more network identifiers received from the second mobile device that is determined to match the network identifier received from the third mobile device.

2. The method of claim 1, wherein processing the network identifiers comprises:

comparing the one or more network identifiers received from the first mobile device to the one or more network identifiers received from the second mobile device; and if at least one of the one or more network identifiers received from the first mobile device matches at least one of the one or more network identifiers received from the second mobile device, determining that the first and second devices are in proximity to one another.

3. The method of claim 1, further comprising communicating a notification to the first mobile device indicating that the second user is in proximity if it is determined that the first and second devices are in proximity to one another.

4. The method of claim 3, further comprising:

receiving an indication from a user of the first mobile device defining proximity; and communicating the notification to the first mobile device only if the second user is within the user-defined proximity for the first user.

5. The method of claim 1, wherein:

at least one of the networks for which a network identifier is received comprises a network access point; and the network identifier of the at least one network comprises a network address of the network access point.

6. The method of claim 5, wherein:

at least one of the networks for which a network identifier is received comprises a wireless network; and the network access point of the at least one network comprises a wireless access point.

7. The method of claim 1, wherein at least one of the network identifiers comprises a media access control (MAC) address associated with the corresponding network.

8. The method of claim 1, wherein at least one of the received network identifiers comprises data identifying a mobile device, the corresponding network of the network identifier comprising a range of a network interface of the mobile device.

9. The method of claim 1, comprising:

receiving a plurality of network identifiers, each associated with a corresponding network, from a plurality of other mobile devices;

comparing the one or more network identifiers received from the first mobile device to the plurality of network identifiers received from the plurality of other mobile devices; and for any of the plurality of network identifiers received from the plurality of other mobile devices that match at least one of the one or more network identifiers received from the first mobile device, determining that the first mobile device and these other mobile devices are in proximity to one another.

10. The method of claim 1, further comprising:

receiving a network identifier from a fourth mobile device;

comparing the network identifier received from the fourth mobile device to the one or more network identifiers received from the first and second mobile devices and the network identifier received from the third mobile device; and determining that the first and fourth mobile devices are in proximity to one another if it is determined that:

at least one of the one or more network identifiers received from the first mobile device matches at least one of the one or more network identifiers received from the second mobile device;

at least one of the one or more network identifiers received from the second mobile device matches the network identifier received from the third mobile device; and the network identifier received from the third mobile device matches the network identifier received from fourth mobile device.

11. The method of claim 1, further comprising, based on the determined proximity of the first and second mobile devices, generating a tree structure that reflects relationships of the networks identified by the one or more network identifiers received from the first mobile device and the one or more network identifiers received from the second mobile device, the tree structure comprising one or more branches each comprising network identifiers for networks determined to be in proximity to one another.

12. The method of claim 11, comprising:

accessing a statistical sampling of network identifiers received from a plurality of mobile devices;

determining, based on a comparison of the network identifiers received from the plurality of mobile devices, which of the plurality of mobile devices are in proximity to one another; and generating the tree structure based on determined relationships of the plurality of network identifiers.

13. The method of claim 1, wherein:

a particular one of the one or more network identifiers received from the first mobile device uniquely identifies a short-range wireless device; and the method further comprises:

receiving network identifiers from a plurality of other mobile devices, each network identifier received from the plurality of other mobile devices uniquely identifying a corresponding short-range wireless device; and determining whether the first mobile device and at least one of the plurality of other mobile devices are in proximity to one another based on comparisons of the network identifier received from the first mobile device to the network identifiers received from the plurality of other mobile devices.

14. The method of claim 1, wherein proximity comprises one or more of the following:

physical proximity of the networks corresponding to the one or more network identifiers received from the first mobile device and the one or more network identifiers received from the second mobile device; and a predefined relationship of the networks corresponding to the one or more network identifiers received from the first mobile device and the one or more network identifiers received from the second mobile device.

15. A system comprising:
one or more memory units; and
one or more processing units, the one or more processing units operable to:
receive one or more network identifiers, each associated with a corresponding network, from a first mobile device;
receive one or more network identifiers, each associated with a corresponding network, from a second mobile device;
process the network identifiers received from the first and second mobile devices to determine whether the first mobile device and the second mobile device are in proximity to one another;
receive a network identifier from a third mobile device;
comparing the network identifier received from the third mobile device to the one or more network identifiers received from the first and second mobile devices; and
determine that the first and third mobile devices are in proximity to one another when it is determined that:
at least one of the one or more network identifiers received from the first mobile device matches at least one of the one or more network identifiers received from the second mobile device; and
at least one of the one or more network identifiers received from the second mobile device matches the network identifier received from the third mobile device, the at least one of the one or more network identifiers received from the first mobile device that is determined to match the at least one of the one or more network identifiers received from the second mobile device being different than the at least one of the one or more network identifiers received from the second mobile device that is determined to match the network identifier received from the third mobile device.

16. A non-transitory computer-readable medium encoded with software, the software when executed by one or more processing units, operable to:
receive one or more network identifiers, each associated with a corresponding network, from a first mobile device;
receive one or more network identifiers, each associated with a corresponding network, from a second mobile device;
process the network identifiers received from the first and second mobile devices to determine whether the first mobile device and the second mobile device are in proximity to one another;
receive a network identifier from a third mobile device;
compare the network identifier received from the third mobile device to the one or more network identifiers received from the first and second mobile devices; and
determine that the first and third mobile devices are in proximity to one another when it is determined that:
at least one of the one or more network identifiers received from the first mobile device matches at least one of the one or more network identifiers received from the second mobile device; and
at least one of the one or more network identifiers received from the second mobile device matches the network identifier received from the third mobile device, the at least one of the one or more network identifiers received from the first mobile device that is determined to match the at least one of the one or more network identifiers received from the second mobile device being different than the at least one of the one or more network identifiers received from the second mobile device that is determined to match the network identifier received from the third mobile device.

17. The method of claim 1, further comprising:
storing, in association with a particular network identifier, aggregate information regarding users of mobile devices from which the particular network identifier has been received, the aggregate information being stored over a first time period; and
communicating, at a second time period, to the first mobile device, in response to receiving the particular network identifier from the first mobile device, a portion of the aggregated information stored for the network corresponding to the particular network identifier, the portion of the aggregate information informing a user of the first mobile device of characteristics of other users of mobile devices from which the particular network identifier has been received, the second time period being later than and distinct from the first time period.

18. The method of claim 1, wherein:
the network corresponding to a first one of the one or more network identifiers received from the first mobile device is a network operating according to a first network protocol;
the network corresponding to a first one of the one or more network identifiers received from the second mobile device is a network operating according to the first network protocol;
the network corresponding to a second one of the one or more network identifiers received from the second mobile device is a network operating according to a second network protocol that is different than the first network protocol; and
the method further comprises:
receiving a network identifier from a fourth mobile device, the network corresponding to the network identifier received from the fourth mobile device being a network operating according to the second network protocol;
comparing the network identifier received from the fourth mobile device to the one or more network identifiers received from the first and second mobile devices; and
determining that the first and fourth mobile devices are in proximity to one another when it is determined that:
the first network identifier received form the first mobile device matches the first network identifier received from the second mobile device; and
the network identifier received from the fourth mobile device matches the second network identifier received from the second mobile device.

19. The method of claim 1, wherein:
a first one of the one or more network identifiers received from the first mobile device is associated with a first network with which the first mobile device is not associated but that is detectable by the first mobile device via a network scan performed by the first mobile device;
a first one of the one or more network identifiers received from the second mobile device is associated with the first network, the second mobile device not being associated with the first network but the first network being detectable by the second mobile device via a network scan performed by the second mobile device, the first network identifier received from the first mobile device being the same as the first network identifier received from the second mobile device; and the method further comprises determining that the first and second mobile devices are in proximity based on the first network identifier received from the first mobile device and the first network identifier received from the second mobile device even though neither the first mobile device nor the second mobile device are associated with the first network.

20. The system of claim 15, wherein:
at least one of the networks for which a network identifier is received comprises a network access point; and
the network identifier of the at least one network comprises a network address of the network access point.

21. The system of claim 15, wherein at least one of the network identifiers comprises a media access control (MAC) address associated with the corresponding network.

22. The system of claim 15, wherein the one or more processing units are further operable to:
receive a network identifier from a fourth mobile device;
compare the network identifier received from the fourth mobile device to the one or more network identifiers received from the first and second mobile devices and the network identifier received from the third mobile device; and
determine that the first and fourth mobile devices are in proximity to one another if it is determined that:
 at least one of the one or more network identifiers received from the first mobile device matches at least one of the one or more network identifiers received from the second mobile device;
 at least one of the one or more network identifiers received from the second mobile device matches the network identifier received from the third mobile device; and
 the network identifier received from the third mobile device matches the network identifier received from fourth mobile device.

23. The system of claim 15, wherein the one or more processing units are further operable to generate, based on the determined proximity of the first and second mobile devices, a tree structure that reflects relationships of the networks identified by the one or more network identifiers received from the first mobile device and the one or more network identifiers received from the second mobile device, the tree structure comprising one or more branches each comprising network identifiers for networks determined to be in proximity to one another.

24. The system of claim 15, wherein:
a particular one of the one or more network identifiers received from the first mobile device uniquely identifies a short-range wireless device; and
the one or more processing units are further operable to:
 receive network identifiers from a plurality of other mobile devices, each network identifier received from the plurality of other mobile devices uniquely identifying a corresponding short-range wireless device; and
 determine whether the first mobile device and at least one of the plurality of other mobile devices are in proximity to one another based on comparisons of the network identifier received from the first mobile device to the network identifiers received from the plurality of other mobile devices.

25. The system of claim 15, wherein:
the network corresponding to a first one of the one or more network identifiers received from the first mobile device is a network operating according to a first network protocol;
the network corresponding to a first one of the one or more network identifiers received from the second mobile device is a network operating according to the first network protocol;
the network corresponding to a second one of the one or more network identifiers received from the second mobile device is a network operating according to a second network protocol that is different than the first network protocol; and
the one or more processing units are further operable to:
 receive a network identifier from a fourth mobile device, the network corresponding to the network identifier received from the fourth mobile device being a network operating according to the second network protocol;
 compare the network identifier received from the fourth mobile device to the one or more network identifiers received from the first and second mobile devices; and
 determine that the first and fourth mobile devices are in proximity to one another when it is determined that:
  the first network identifier received form the first mobile device matches the first network identifier received from the second mobile device; and
  the network identifier received from the fourth mobile device matches the second network identifier received from the second mobile device.

26. The system of claim 15, wherein:
a first one of the one or more network identifiers received from the first mobile device is associated with a first network with which the first mobile device is not associated but that is detectable by the first mobile device via a network scan performed by the first mobile device;
a first one of the one or more network identifiers received from the second mobile device is associated with the first network, the second mobile device not being associated with the first network but the first network being detectable by the second mobile device via a network scan performed by the second mobile device, the first network identifier received from the first mobile device being the same as the first network identifier received from the second mobile device; and
the one or more processing units are further operable to determine that the first and second mobile devices are in proximity based on the first network identifier received from the first mobile device and the first network identifier received from the second mobile device even though neither the first mobile device nor the second mobile device are associated with the first network.

* * * * *